United States Patent
Hanna et al.

(10) Patent No.: US 7,192,217 B2
(45) Date of Patent: Mar. 20, 2007

(54) BAFFLE APPARATUS

(75) Inventors: Leslie J. Hanna, Arvada, CO (US); Brent W. Mefford, Lakewood, CO (US)

(73) Assignee: United States of America Department of the Interior, Bureau of Reclamation, Washington, DC (US)

( * ) Notice: Subject to any disclaimer, the term of this patent is extended or adjusted under 35 U.S.C. 154(b) by 0 days.

(21) Appl. No.: 10/248,919

(22) Filed: Mar. 1, 2003

(65) Prior Publication Data

US 2004/0170475 A1 Sep. 2, 2004

(51) Int. Cl.
E02B 3/04 (2006.01)
(52) U.S. Cl. .......................................... 405/28; 405/80
(58) Field of Classification Search .................. 405/73, 405/77, 80, 81, 118, 119, 87, 94, 99, 100, 405/104, 28, 302.6
See application file for complete search history.

(56) References Cited

U.S. PATENT DOCUMENTS

| | | | |
|---|---|---|---|
| 969,967 A * | 9/1910 | MacDonald | 405/77 |
| 1,206,938 A | 12/1916 | Stimmel et al. | |
| 1,529,966 A * | 3/1925 | Sirnit | 405/105 |
| 1,561,796 A | 11/1925 | Rehbock | |
| 1,621,170 A * | 3/1927 | Landau | 405/81 |
| 1,680,722 A * | 8/1928 | Bennett et al. | 405/82 |
| 2,103,600 A | 12/1937 | Stevens | 61/18 |
| 2,240,049 A * | 4/1941 | Murphy | 405/106 |
| 2,625,798 A * | 1/1953 | Reed | 405/81 |
| 2,637,171 A * | 5/1953 | Black | 405/106 |
| 2,710,505 A * | 6/1955 | Magill | 405/28 |
| 2,832,203 A | 4/1958 | Bernard | 61/18 |
| 3,001,316 A * | 9/1961 | Wilson | 43/19 |

(Continued)

FOREIGN PATENT DOCUMENTS

GB 2138661 A * 10/1984

(Continued)

OTHER PUBLICATIONS

Leslie Hanna and Elisabeth Cohen, Abrasion/Erosion in Stilling Basins.

(Continued)

Primary Examiner—Suzanne Dino Barrett
Assistant Examiner—Gay Ann Spahn
(74) Attorney, Agent, or Firm—Roger A. Jackson

(57) ABSTRACT

A baffle apparatus and method for directing fluid flow to reduce damage to an energy dissipating basin that includes an inlet, an outlet, a floor, a sidewall that extends upward from an edge of the floor, and an opposing sidewall that extends upward from an opposing edge of the floor defining a basin interior with a basin span between the sidewall and the opposing sidewall. The baffle apparatus includes a deflector structure that is generally planar and is fixedly or adjustably positioned substantially transverse to a downstream direction flow in the basin, the deflector structure spanning between the sidewall and the opposing sidewall above the floor. Also included, is a retaining structure for fixedly or adjustably positioning and securing the deflector structure to the sidewall. The deflector structure directs flow in the basin to flow in a downstream direction from a reverse upstream direction adjacent to the basin floor.

16 Claims, 13 Drawing Sheets

U.S. PATENT DOCUMENTS

| | | | | |
|---|---|---|---|---|
| 3,618,623 A | * | 11/1971 | Boaz | 137/1 |
| 3,785,159 A | * | 1/1974 | Hammond | 405/77 |
| 4,089,179 A | * | 5/1978 | Trautman | 405/74 |
| 4,352,593 A | | 10/1982 | Iskra et al. | 405/108 |
| 4,372,854 A | | 2/1983 | Szereday | 210/242.3 |
| 5,013,369 A | * | 5/1991 | Kato | 134/24 |
| 5,041,217 A | * | 8/1991 | Reid | 210/194 |
| 5,061,118 A | | 10/1991 | Lemperiere | 405/108 |
| 5,595,457 A | | 1/1997 | Stucks | 405/87 |
| 5,788,410 A | * | 8/1998 | Stucks | 405/87 |
| 6,059,490 A | | 5/2000 | Kauppi | 405/108 |
| 6,171,023 B1 | | 1/2001 | Townshend | 405/94 |
| 6,638,424 B2 | * | 10/2003 | Stever et al. | 210/170 |
| 2002/0021939 A1 | * | 2/2002 | Allard | 405/43 |
| 2005/0074289 A1 | * | 4/2005 | Tucker | 405/81 |

FOREIGN PATENT DOCUMENTS

| | | | | |
|---|---|---|---|---|
| IT | 608480 | * | 1/1960 | 405/28 |
| JP | 56-167012 A | * | 12/1981 | 405/28 |
| JP | 58-62204 | * | 4/1983 | 405/28 |
| NL | 8300906 A | * | 10/1984 | 405/73 |
| SU | 1142585 A | * | 2/1985 | 405/80 |
| SU | 1142586 A | * | 2/1985 | 405/80 |
| SU | 1754839 A1 | * | 8/1992 | 405/73 |

OTHER PUBLICATIONS

American Society of Civil Engineers (ASCE), Aug. 1997, pp. 1-6. Energy and Water: Sustainable Development, Proceedings of Theme D, (ASCE) New York, New York.

* cited by examiner

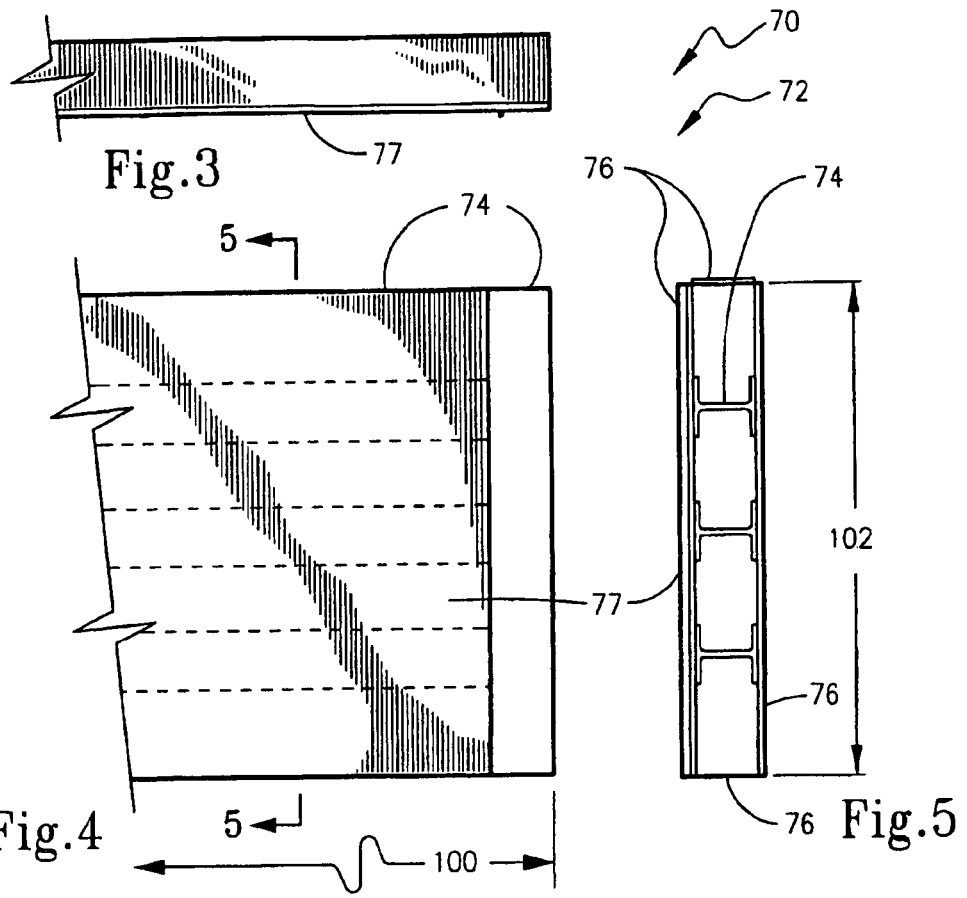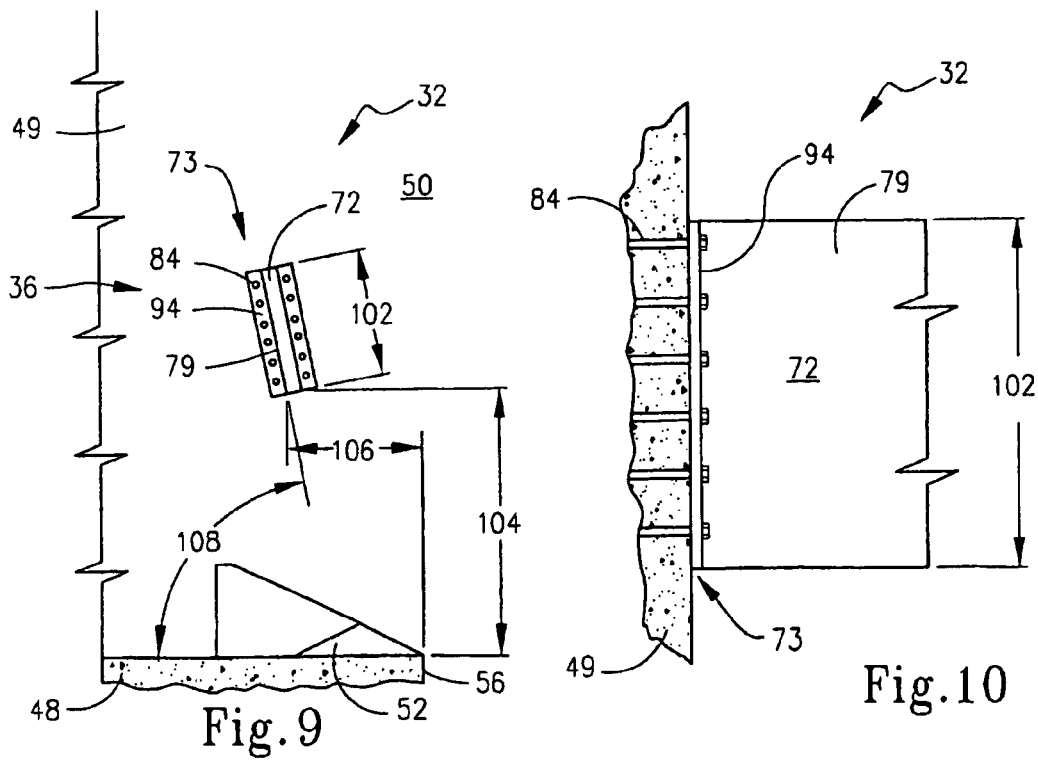

BAFFLE APPARATUS

TECHNICAL FIELD

The present invention relates generally to apparatus used for the dissipation of hydraulic or kinetic energy in open channel flow to minimize the damage to the flow channel from the hydraulic or kinetic energy present in the fluid flow. More particularly, the present invention relates to a baffle apparatus that is used to control counter rotating eddys that are adjacent to an energy dissipating basin outlet floor to minimize damage to the energy dissipating basin outlet floor and sidewalls due to downstream materials being carried upstream and being deposited upon the energy dissipating basin floor and sidewalls causing abrasive damage to the energy dissipating basin floor and sidewalls from the turbulent fluid flow.

BACKGROUND OF INVENTION

It is well known in the field of hydraulic engineering, that there is an ongoing need to reduce or inhibit erosion caused by rivers, streams, and other waterways that are both natural and man-made. The causes of erosion are many, coming about where there is a change in grade or various man-made devices that impart a high level of fluid energy into the fluid flow. This has been recognized in the prior art as there are various types of hydraulic energy dissipation devices or apparatus which are commonly referred to under the collective term "energy dissipators", and are used to provide erosion control protection by serving as, among other things, dam energy dissipating basins, dropped structures in natural streams, man-made channels, and gate control structures in natural streams or man-made channels. The significant resources devoted by many governmental and private agencies to protect civil structures such as canals, dams, or other waterways constructed of earth materials or man-made materials from erosion has resulted in the development of a relatively wide range of prior art fluid energy dissipation and other erosion protection systems.

One significant category of open channel flow prior art fluid flow energy dissipators is termed a "hydraulic jump" in the hydraulic engineering arts, and utilizes non uniform flow which occurs when supercritical flow has its velocity reduced to sub critical flow. In an open flow channel, or more particularly an energy dissipating basin for instance, the hydraulic jump is intentionally created, typically forming where the design energy dissipating basin floor slope changes from steep to level or near level in the downstream direction as on the apron base of an energy dissipating basin. The hydraulic jump is characterized by a discontinuity of the fluid surface with a steep upward slope in the downstream direction, with the fluid surface appearing to have highly turbulent flow. The hydraulic jump in this instance serves a useful purpose, for it dissipates much of the destructive energy of the high velocity fluid, thereby reducing downstream erosion. Unfortunately, however, the hydraulic jump can create undesirable rotating eddy currents that occur in the rise in the water surface slightly downstream of the slope change wherein the fluid is transitioning from a high velocity to a lower velocity. The rise in water surface being observed to have violent turbulence with under the surface rotating eddy currents that result in the fluid flowing in a downstream direction then reversing direction and flowing in a upstream direction, then subsequently reversing direction again and flowing in the downstream direction in a somewhat elliptical path thus causing a dissipation of fluid energy. If the rotating eddy currents are either contained within the fluid flow or do not cause other problems, then they are not usually of concern. Thus, the overall objective of the hydraulic jump is to reduce the velocity of the fluid flow downstream of the hydraulic jump in a manner to minimize erosion damage to the open flow channel from high fluid flow velocities.

Given the desirability of the hydraulic jump, the next critical factor in hydraulic engineering is to control the position or location of the hydraulic jump and thus the rotating eddy currents within the open channel given the objective of minimizing erosion damage due to high fluid flow velocities in the open channel. Controlling factors are the rate of grade transition change of the flow channel, the differential in fluid velocities, and the sizing of the flow channel, all of which can be accounted for in the hydraulic engineering design. However, there is another complicating factor in that for a fixed grade transition change, fixed fluid velocity differential, and fixed flow channel sizing, there is also the issue of a significant variances in fluid flow rate within the fixed flow channel in going from 0 percent to 100 percent that can cause the hydraulic jump position and severity in fluid flow velocity differentials, and the location and size of the rotating eddy currents to change. In other words, the aforementioned fixed factors are in reality optimized for the hydraulic jump to properly dissipate energy at a particular fixed flowrate, and when deviations occur from this fixed flowrate either being higher or lower, results in compromise of the beneficial effect of the hydraulic jump in dissipating kinetic fluid energy, thus possibly increasing the erosion damage to the open flow channel. This is because, with changes in flowrate, not only the fluid velocities change but also the position and size of the rotating eddy current which can result in increased erosion and/or abrasion of the open flow channel, due for instance from the depositing of streambed material into the energy dissipating basin, wherein the streambed material erodes and/or abrades the energy dissipating basin from the high velocities and turbulence of the fluid.

One prior art solution disclosed in U.S. Pat. No. 1,561,796 to Rehbock focused upon the destructive effect of high fluid flow velocities existing at the outlet of the energy dissipating basin wherein the earth streambed would suffer a high degree of erosion directly adjacent to the energy dissipating basin outlet. Rehbock utilized what is called an "apron" or end sill that was positioned directly adjacent to the energy dissipating basin outlet floor. This apron was designed to create a ground eddy that was positioned just above the earth streambed that created the effect of a reverse direction flow, in other words an upstream flow just over the earth streambed directly adjacent to the apron. In addition, flow gaps in the apron allowed thin jets of water running in the normal downstream direction to counteract the reverse flow eddy in an attempt to create a near zero fluid flow velocity upon the earth streambed directly adjacent to the apron. The gaps also allowed sediment that was trapped in the energy dissipating basin to flow through the outlet of the energy dissipating basin and not be trapped in the energy dissipating basin. The shortcoming of Rehbock is related to the situation wherein the fluid flow rate varies greatly causing the ground eddy to change in position, size, and velocity that could cause earth streambed erosion and/or trap earth streambed sediment in the energy dissipating basin that was unable to exit the energy dissipating basin through the outlet gaps.

This problem was also recognized in the U.S. Pat. No. 2,103,600 to Stevens that discloses a plurality of baffle blocks that are arranged in rows in addition to being staggered with respect to the individual blocks in an adjacent row with the baffle blocks being mounted on the upstream side and adjacent to the end sill or outlet of the energy dissipating basin. Stevens's goal was to create a reverse eddy flow on the floor of the earth streambed directly adjacent to the energy dissipating basin outlet to redeposit earth and streambed sediment against the energy dissipating basin outlet to prevent undermining or loss of earth streambed material directly adjacent to the energy dissipating basin outlet while accommodating different fluid flow rates. Similar to Stevens, in U.S. Pat. No. 6,059,490 to Kauppi, also disclosed is a plurality of blocks that are arranged in rows and stacked upon each other in a shingle like overlap such that the blocks of each row are offset relative to the blocks of each adjacent row. Kauppi states that these blocks impart perpendicular velocity components in the fluid flow relative to the downstream direction of fluid flow, thus creating additional turbulence, which results in more kinetic energy dissipation of the fluid flow.

What is needed is a structure mounted within the energy dissipating basin that is operational to control the reverse flow eddy that occurs directly adjacent to the energy dissipating basin outlet apron over and just above the earth streambed while at the same time accommodating the changes in the position, size, and velocity of the reverse flow eddy that occur with changes in fluid flowrate in the energy dissipating basin resulting in the minimization of damage to both the energy dissipating basin itself and the earth stream bed. Ultimately, the purpose is two fold with the desired structure, firstly, is to not to disturb the earth stream bed either by allowing a washout of the earth streambed material adjacent to the energy dissipating basin outlet causing an undermining in this area and secondly, to help prevent the depositing of earth streambed material into the energy dissipating basin itself wherein the stream bed material becomes trapped in the energy dissipating basin and remains in an agitated state from fluid flow turbulence causing a high degree of erosion and/or abrasion on the energy dissipating basin itself.

SUMMARY OF INVENTION

The present invention is a baffle apparatus for directing fluid flow to reduce damage to an open flow channel energy dissipating basin that includes an inlet, an outlet, a floor, a sidewall that extends upward from an edge of the floor, and an opposing sidewall that extends upward from an opposing edge of the floor defining an open flow channel energy dissipating basin interior with an energy dissipating basin span between the sidewall and the opposing sidewall. Broadly, the present invention includes a deflector structure that is generally planar and is fixedly positioned substantially transverse to a downstream direction flow in the energy dissipating basin. The deflector structure spanning between the sidewall and the opposing sidewall above the floor, wherein the deflector structure directs flow in the energy dissipating basin to flow in a downstream direction from a reverse upstream direction adjacent to the energy dissipating basin floor. In addition, the present invention includes a means for fixedly positioning and securing the deflector structure to the sidewall.

In an alternative embodiment, the present invention broadly includes a deflector structure that is generally planar and is adjustably positioned substantially transverse to a downstream direction flow axis in the energy dissipating basin. The deflector structure spanning between the sidewall and the opposing sidewall above the floor, wherein the deflector structure directs flow in the energy dissipating basin to flow in a downstream direction from a reverse upstream direction adjacent to the energy dissipating basin floor. In addition, the alternative embodiment of the present invention includes a means for selectively adjustably positioning and securing the deflector structure to the sidewall.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 3 shows a plan view of the deflector structure;

FIG. 4 shows an upstream side view of the deflector structure;

FIG. 5 shows a crossectional view of the deflector structure as indicated in the section 5—5 cutaway in FIG. 4;

FIG. 9 shows a side view of the fixedly positioned baffle apparatus assembly from the energy dissipating basin sidewall;

FIG. 10 shows a crossectional view of the means for fixedly positioning and securing the fixedly positioned deflector structure to the energy dissipating basin side wall from the upstream side;

REFERENCE NUMBER IN DRAWINGS

Figure 1:
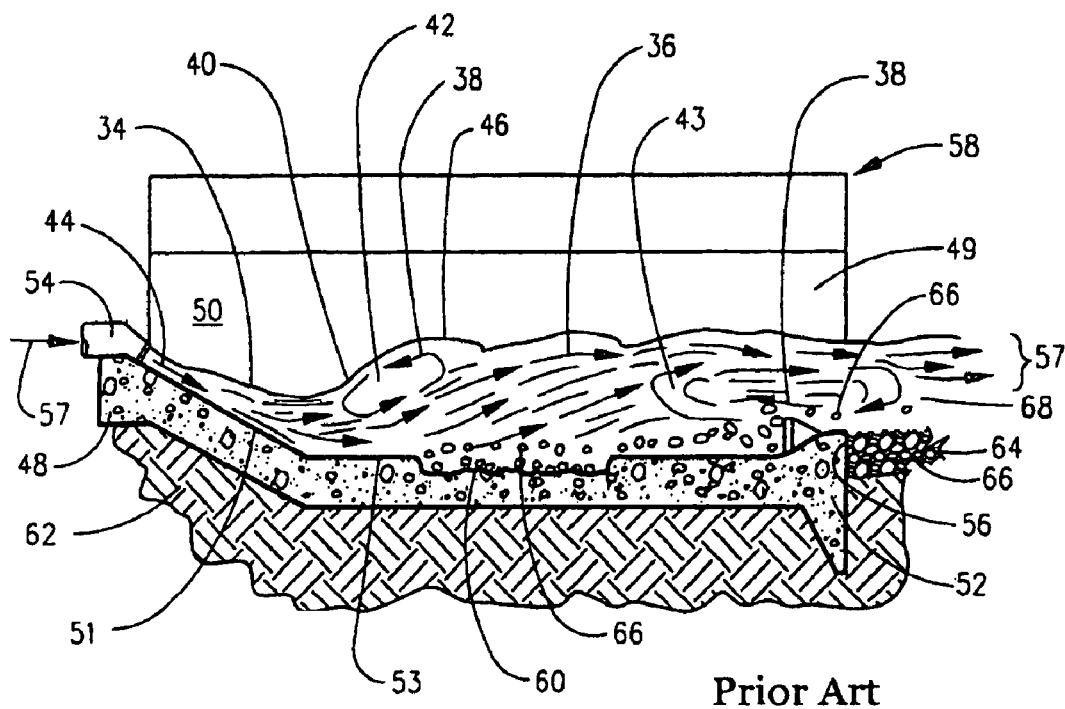
FIG. 1 shows a crossectional side view of the energy dissipating basin in operation without the present invention, wherein the energy dissipating basin is experiencing abrasion damage from the streambed material due to a counter rotating eddy.

30 Adjustably positioned baffle apparatus assembly
32 Fixedly positioned baffle apparatus assembly
34 Fluid
36 Downstream direction flow
38 Upstream direction flow
40 Hydraulic jump
42 Counter rotating eddy upstream defined as the velocity transition point
43 Counter rotating eddy downstream defined as the velocity transition point
44 High velocity jet
46 Fluid free surface
48 Energy dissipating basin floor
49 Energy dissipating basin sidewall
50 Energy dissipating basin interior
51 Energy dissipating basin slope
52 End sill
53 Energy dissipating basin level or near level transition
54 Energy dissipating basin inlet
55 Opposing energy dissipating basin sidewall
56 Energy dissipating basin outlet
57 Energy dissipating basin flow
58 Open flow channel energy dissipating basin
59 Energy dissipating basin floor edge
60 Energy dissipating basin damage
61 Energy dissipating basin opposing floor edge
62 Earth
64 Apron
66 Streambed material
68 Energy dissipating basin outlet flow adjacent to end sill
70 Deflector structure adjustably positioned
71 Means for selectively adjustably positioning and securing the adjustably positioned deflector structure to the energy dissipating basin sidewall
72 Deflector structure fixedly positioned
73 Means for fixedly positioning and securing the fixedly positioned deflector structure to the energy dissipating basin sidewall
74 Deflector structure framework
76 Deflector structure panels
77 Deflector structure face for the adjustably positioned deflector structure
78 Channel deflector structure guide for adjustable deflector
79 Deflector structure face for the fixedly positioned deflector structure 80 Channel structure guide trunnion
82 Trunnion pin anchor
84 Epoxy anchors
86 Adjustably positioned deflector structure floor distance adjustment
87 Adjustment lock nuts
88 Adjustably positioned deflector structure angle adjustment
89 Adjustably positioned deflector structure angle adjustment frame
90 Adjustably positioned deflector structure floor distance adjustment locking element assembly expander
91 Adjustably positioned deflector structure angle adjustment locking element assembly
92 Adjustably positioned deflector structure floor distance adjustment locking wedge assembly
93 Pivotal attachment between the structure angle adjustment and the channel deflector structure guide
94 Fixedly positioned deflector structure support
100 Deflector structure span
102 Deflector structure height
104 Deflector structure height above energy dissipating basin floor
106 Deflector structure distance upstream from energy dissipating basin outlet
108 Deflector structure angle to energy dissipating basin floor
110 Energy dissipating basin span between the opposing energy dissipating basin walls
112 Spacer shim
114 Clearance between the sidewall and the channel deflector structure
116 Clearance of the planar deflector structure slidable engagement with the channel
118 Clearance of the locking element wedge assembly between the channel and the planar deflector structure

DETAILED DESCRIPTION

With initial reference to FIG. 1 shown is a crossectional side view of a prior art open flow channel energy dissipating basin 58 in operation without the present invention, wherein the open flow channel energy dissipating basin 58 is experiencing abrasion damage 60 from the streambed material 66, which is due to the streambed material 66 being carried by the counter rotating eddy 43 into the open flow channel energy dissipating basin 58. The open flow channel energy dissipating basin 58 as shown includes an inlet 54, an outlet 56, a floor 48, a sidewall 49 that extends upward from an edge of the floor (not shown), and an opposing sidewall (not shown) that extends upward from an opposing edge (not shown) of the floor 48 defining an open flow channel energy dissipating basin interior 50 with a energy dissipating basin span (not shown) between the sidewall 49 and the opposing sidewall (not shown). The open flow channel energy dissipating basin 58 which includes the floor 48, the sidewall 49, the opposing sidewall (not shown), and an end sill 52 are generally constructed of concrete, wherein the energy dissipating basin floor 48 and the end sill 52 are formed against the earth 62 and occasionally the sidewall 49 is formed against the earth 62, and the opposing sidewall (not shown), is also occasionally formed against the earth 62. Immediately adjacent to the energy dissipating basin outlet 56 is a layer of streambed material 66 that is placed upon the earth 62 to help protect the earth 62 from erosion due to the energy dissipating basin outlet flow 68 that is adjacent to the end sill 52 of the open flow channel energy dissipating basin 58. The area immediately adjacent downstream of the end sill 52 that includes the streambed material 66 is also called an apron 64. The stream bed material 66 is usually constructed of different sizes of lose gravel and rock that can be held in place by gravity. The fluid 34 is typically water; however, other fluids could be applicable as well such as water mixed with other substances, or other fluids that have hydraulic properties similar to water for density, viscosity, and the like.

In operation, the prior art open flow channel energy dissipating basin 58 utilizes the energy dissipating basin inlet 54 that receives an energy dissipating basin flow 57 coming from typically an upstream dam outlet works. However, the energy dissipating basin flow 57 could simply be any upstream fluid flow communication. Typically, this energy dissipating basin flow 57 is at a high fluid flow velocity 44 that is considered to be too high of fluid flow velocity 44 for the apron 64 to successfully endure without excessive erosion damage. Thus, the purpose of the open flow channel energy dissipating basin 58 overall is to dissipate the high level of kinetic fluid flow energy that exists from the high fluid flow velocity 44 at the energy dissipating basin inlet 54 in order to reduce this high level of kinetic fluid flow energy at the energy dissipating basin inlet 54 to the lower level of kinetic fluid flow energy 57 at the energy dissipating basin outlet 56 to reduce the erosion damage of the apron 64.

This reduction of kinetic fluid flow energy from the energy dissipating basin inlet 54 to the energy dissipating basin outlet 56 is accomplished through the use of an intentionally created "hydraulic jump" 40 which is a term of art in hydraulic engineering. The hydraulic jump utilizes non uniform flow, which occurs when supercritical flow has its velocity reduced to subcritical flow. In an open flow channel, or more particularly the open flow channel energy dissipating basin 58, the hydraulic jump 40 is intentionally created by controlling the design energy dissipating basin floor slope changes occurring at the transition from the energy dissipating basin slope 51 to the energy dissipating basin level or near level transition 53 in the downstream direction flow axis 36. The hydraulic jump 40 is characterized by a discontinuity of the fluid surface 46, with the fluid surface 46 having a steep upward slope in the downstream direction as shown in FIG. 1, with the fluid surface 46 having a highly turbulent flow. However, even though the hydraulic jump 40 is very useful for dissipating the kinetic fluid flow energy from the energy dissipating basin inlet 54 to the energy dissipating basin outlet 56, the hydraulic jump 40 does create some potentially undesirable rotating eddy currents, wherein the rotating eddy currents are actually flow direction reversals that occur within the hydraulic jump 40. These eddy currents occur within the rise of the fluid surface 46 and exist slightly downstream of the previously described slope change wherein the transition from the energy dissipating basin slope 51 into the energy dissipating basin level or near level transition 53 in the downstream direction flow axis 36 occurs, with the rotating eddy currents caused from the fluid 34 transitioning from a high velocity to a low velocity. The rise in fluid surface 46 is observed to have quite violent turbulence with the rotating eddy currents resulting from the fluid flowing in a downstream direction 36 and then reversing direction and flowing in an upstream direction flow 38 and then subsequently reversing flow direction again and flowing in the downstream direction 36 which has a beneficial result of the dissipation of kinetic fluid energy. The aforementioned rotating eddy current flows form a somewhat elliptical orbit within and adjacent to the hydraulic jump 40. In FIG. 1 there is shown an upstream counter rotating eddy current 42 and a downstream counter rotating eddy current 43 which are both shown being somewhat elliptical in orbit or shape by the flow arrows that depict the flow reversal or transition points between the upstream direction flow 38 and the downstream direction flow 36.

The counter rotating eddy currents may or may not be of concern to the hydraulic engineer, depending upon the location, size, and severity or the magnitude of the velocity transition between the downstream direction flow 36 and the upstream direction flow 38, what is of significance to hydraulic engineer is the potential for damage to either the open flow channel energy dissipating basin 58 or the apron 64. In FIG. 1 the counter rotating eddy current of concern is shown as the downstream counter rotating eddy current 43 as having damage potential to both the apron 64 and the open flow channel energy dissipating basin 58. If the counter rotating eddy currents are either contained within the fluid 34 or do not cause other problems such as damage either to the open flow channel energy dissipating basin 58 or the apron 64 then these counter rotating eddy currents are not usually of concern, such as the case with the upstream counter rotating eddy current 42 as shown in FIG. 1. The downstream counter rotating eddy current 43 of concern as shown in FIG. 1 is that the upstream direction flow 38 picks up streambed material 66 from the apron 64 bringing the streambed material 66 over the end the sill 52 and depositing the streambed material 66 into the energy dissipating basin interior 50. The stream bed material 66 tends to become trapped within the energy dissipating basin interior 50 due to the upstream direction flow 38 continuously driving the stream bed material 66 into the energy dissipating basin interior 50 and due to the turbulent action of the fluid 34, the streambed material 66 impacts in particular the energy dissipating basin floor 48 and possibly the energy dissipating basin sidewall 49 or the opposing energy dissipating basin side wall (not shown) causing nonstop abrasive damage 60 to the concrete structure of the open flow channel energy dissipating basin 58 resulting in a rapid deterioration of the concrete structure.

Figure 2:
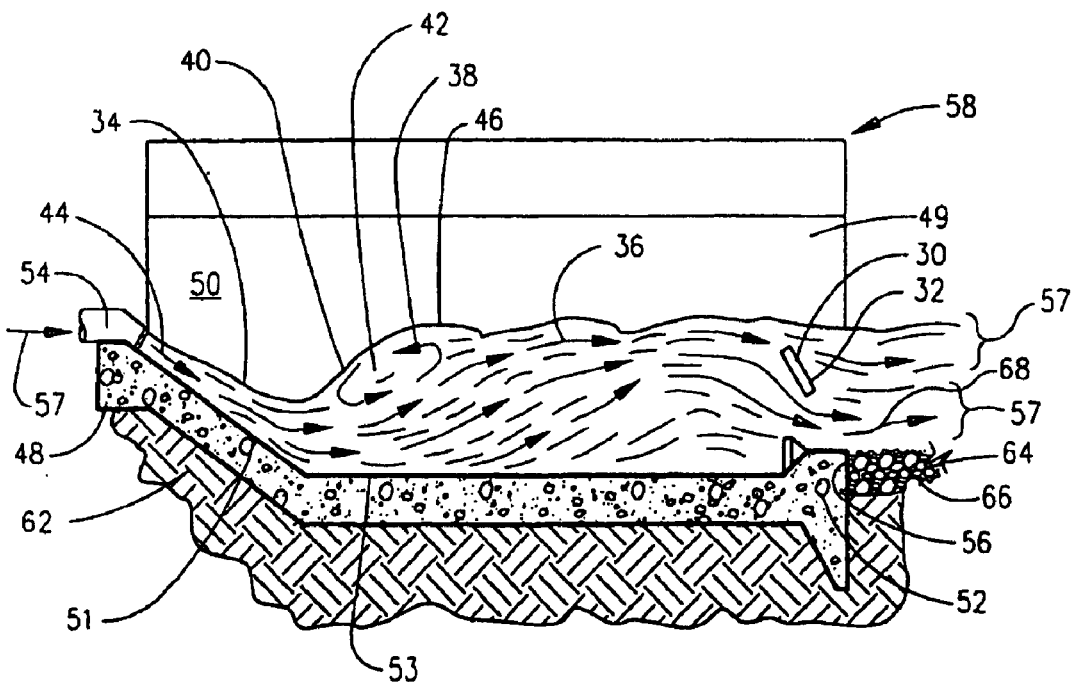
FIG. 2 shows a crossectional side view of the energy dissipating basin in operation with the present invention, wherein the energy dissipating basin is not experiencing abrasion damage from the streambed material due to the absence of the counter rotating eddy.

Further, to FIG. 2 shown is a crossectional side view of the same open flow channel energy dissipating basin 58 in operation as shown in FIG. 1 with the addition of the present invention being the fixedly positioned baffle apparatus assembly 32 or the alternative embodiment of the adjustably positioned baffle apparatus assembly 30. In either embodiment the baffle apparatus assembly 30 or 32 acts to direct the downstream direction fluid flow 36 to overcome the upstream direction flow 38 (in FIG. 1) of the counter rotating eddy downstream 43 (in FIG. 1) to effectuate having downstream direction fluid flow 36 at the energy dissipating basin outlet 56 for the energy dissipating basin outlet flow adjacent to the end sill 68 for the energy dissipating basin flow 57. This acts to eliminate the counter rotating eddy downstream 43 as shown in FIG. 2, which results in the streambed material 66 staying in place on the apron 64, with the beneficial effect being that there is no streambed material 66 trapped in the energy dissipating basin interior 50 that can cause abrasive damage to either the energy dissipating basin floor 48 and/or the energy dissipating basin sidewall 49 or opposing energy dissipating basin side wall (not shown) as previously shown in FIG. 1. Note that the counter rotating eddy upstream 42 still exists as the counter rotating eddy upstream 42 is not in a position or location to cause damage to either the open flow channel energy dissipating basin 58 or the apron 64 and is thus not of a concern from a hydraulic engineering standpoint.

The position of the fixedly positioned baffle apparatus assembly 32 or the alternative embodiment of the adjustably positioned baffle apparatus assembly 30 is important to the successful function of the baffle apparatus in that the baffle apparatus is designed to capture and directionally deflect the downstream direction flow 36 adjacent to the fluid surface 46 near the energy dissipating basin outlet 56 and direct the downstream direction flow 36 toward the end still 52 of the open flow channel energy dissipating basin 58. As previously stated, this capturing of the downstream direction flow 36 and directing it towards the end still 52 eliminates the downstream counter rotating eddy current 43 (shown in FIG. 1) and subsequently upstream direction flow 38 of the downstream counter rotating eddy current 43, allowing the streambed material 66 to stay in place on the apron 64, preventing streambed material 66 from migrating into the energy dissipating basin interior 50 and causing abrasive damage from the fluid 34 turbulence as against the energy dissipating basin floor 48 and/or the energy dissipating basin sidewall 49 and the opposing energy dissipating basin sidewall (not shown). The specifics of positioning both the fixably positioned baffle apparatus assembly 32 or the alternative embodiment of the adjustably positioned baffle apparatus 30 are given in more detail in FIG. 6 and FIG. 9 concerning the angle of the baffle, the baffle position above the energy dissipating basin floor 48, and the baffle distance from the energy dissipating basin outlet 56 based upon the velocity profiles measured at the energy dissipating basin outlet for the range of open flow channel energy dissipating basin 58 flowrates.

Moving next to FIGS. 3, 4, and 5 shown is detail of the deflector structure itself, being the fixedly positioned deflector structure 72 and the adjustably positioned deflector structure 70, the construction of the basic deflector structure is substantially similar for both the fixedly positioned deflector structure 72 and the adjustably positioned deflector structure 70, thus the following description shall apply to both. FIG. 3 shows a plan view of the deflector structure 70, 72, with FIG. 4 showing an upstream side view of the deflector structure 70, 72, and FIG. 5 showing a crossectional view of the deflector structure 70, 72 as indicated in the section 5—5 cutaway shown in FIG. 4. The deflector structure 70, 72 is generally planar and preferably assumes a generally parallelepiped shape as an assembly. The span of the deflector structure 70, 72 is generally indicated by a dimension 100, wherein dimension 100 is close to the energy dissipating basin span between the opposing energy dissipating basin walls (not shown). The deflector structure 70, 72 height is generally indicated by dimension 102 and is preferably about 5 ft. The face 77 of the deflector structure 70, 72 faces the upstream side of the open flow channel energy dissipating basin (not shown), with the face 77 represented by an area defined by the span of the deflector structure 70, 72 that is generally indicated by the dimension 100 and the deflector structure 70, 72 height that is generally indicated by dimension 102. However, the deflector structure 70, 72 height dimension 102 could be more or less than 5 ft. depending upon the positional optimization of the deflector structure 70, 72 in the baffle apparatus assembly based upon the specific test results from the velocity profiles measured at the energy dissipating basin outlet (not shown). The deflector structure 70, 72 framework 74 is conventionally constructed in a ladder framework with a plurality of structural steel beams that are preferably wide flange I-beams that are 8 in. in size and that have a weight of 18 lbs. per linear foot. The perimeter of the deflector structure 70, 72 framework 74 is preferably constructed of a combination of channel beams that are 8 in. in size and that have a weight of 13.75 lbs. per linear foot and ½ inch thick structural steel flat stock. The deflector structure 70, 72 framework 74 is preferably enclosed by a plurality of panels 76 that are constructed of a combination of ⅛ inch to ½ inch thick steel plates. Conventional structural steel assembly and attachment methods are utilized, but not limited to coping, welding, and bolting to facilitate assembly of the deflector structure 70, 72 framework 74 and the panels 76. The strength required for the deflector structure 70, 72 is based upon the size of the deflector structure 70 72, specifically the deflector structure span 100, the deflector structure height 102, and the loading that the deflector structure 70 72 is subjected to in use from the downstream direction of flow (not shown) utilizing conventional engineering calculations for the aforementioned material strength requirements. Based on the foregoing it can be seen that for a multitude of different deflector structure 70, 72 span 100 dimensions, deflector structure 70, 72 height 102 dimensions, and wide variance and loading in use upon the deflector structure 70, 72 from the downstream direction of flow (not shown), different materials, sizes, and construction/assembly methods could be utilized for the deflector structure framework 74 and the panels 76 from those specified above for construction of the deflector structure.

Figure 6:
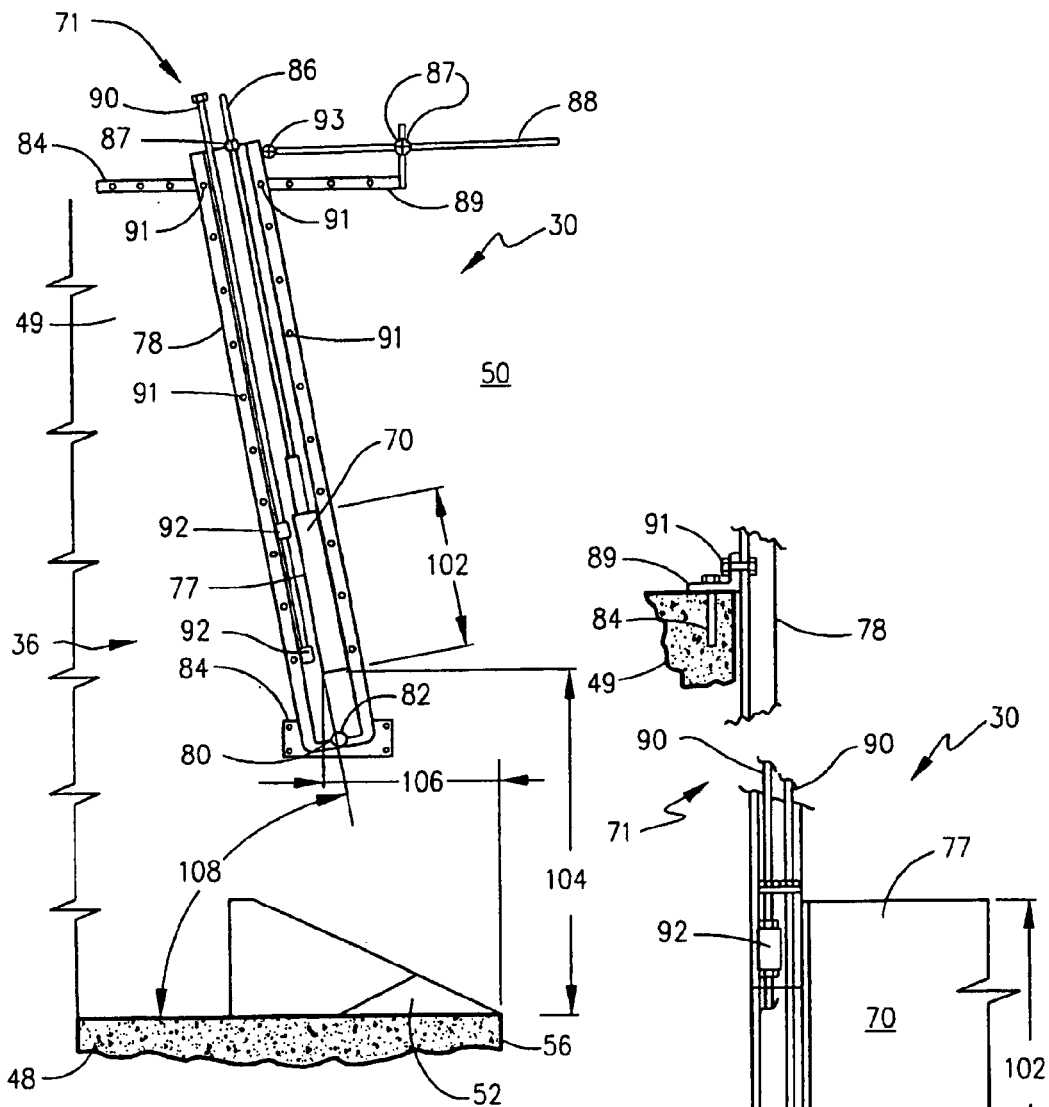
FIG. 6 shows a side view of the adjustably positioned baffle apparatus assembly from the energy dissipating basin sidewall.

Further to FIG. 6 shown is a side view of the adjustably positioned baffle apparatus assembly 30 from the opposing energy dissipating basin sidewall side (not shown). For orientation purposes a portion of the open flow channel energy dissipating basin is shown that includes the energy dissipating basin floor 48, the end sill 52, the energy dissipating basin outlet 56, the energy dissipating basin sidewall 49, and the energy dissipating basin interior 50. Additionally, the downstream direction of flow 36 is also shown. Also, the deflector structure that is adjustably positioned 70 with the deflector structure height dimension 102 is shown as it resides within the means 71 for selectively adjustably positioning and securing the adjustably positioned deflector structure 70 to the energy dissipating basin sidewall 49. The means 71 for selectively adjustably positioning and securing the deflector structure 70 is sized and constructed based upon conventional engineering calculations and fabrication methods for the aforementioned deflector structure 70 loading and is preferably comprised of a channel deflector structure guide 78 preferably constructed of a ½ in., ¾ in., and 1 in. combination steel plate weldment. The channel deflector structure guide 78 is engaged or alternatively slidably engaged with the deflector structure 70, with the channel deflector structure guide 78 also being pivotally attached to the energy dissipating basin sidewall 49 on one end and adjustably attached to the energy dissipating basin sidewall 49 on the other end. The pivotal attachment between the channel deflector structure guide 78 and the energy dissipating basin sidewall 49 is accomplished by a rotational engagement between a guide trunnion 80 in the channel structure guide 78 and a trunnion pin anchor 82, with the trunnion pin anchor 82 secured to the to the energy dissipating basin sidewall 49 by use of an epoxy anchor 84. The adjustable attachment between the channel deflector structure guide 78 and the energy dissipating basin sidewall 49 is accomplished by the use a deflector structure angle adjustment 88 in conjunction with an angle adjustment locking element assembly 91 that is secured to an angle adjustment frame 89 that is in turn secured to the energy dissipating basin side wall 49 by also the use an epoxy anchor 84. The number of epoxy anchors 84 is determined by the loading imposed upon the entire adjustably positioned baffle apparatus assembly 30 from the downstream direction of flow 36 by conventional engineering calculations. Alternatives to epoxy anchors 84 would be acceptable if they meet the aforementioned loading requirements. Preferably, the deflector structure angle adjustment 88 is constructed of a threaded rod that utilizes lock nuts 87 attached to the angle adjustment frame 89 with a conventional rod end pivotal attachment 93 to the channel structure guide 78 as shown in FIG. 6. The angle adjustment locking element assembly 91 preferably utilizes any conventional attachment, such as a nut and bolt to secure the channel deflector structure guide 78 to the angle adjustment frame 89. However, any other form of deflector structure 70 angle adjustment mechanism and securing or locking element mechanism for the channel structure guide 78 to the energy dissipating basin sidewall 49 would be acceptable that accomplishes the same function as the aforementioned components.

In operationally physically adjusting the angle of the channel structure guide 78 and hence the deflector structure 70, the angle of concern is identified as angle 108 as shown in FIG. 6, which is basically the angle of the deflector structure 70 face 77 that corresponds to the deflector structure height dimension 102 as it forms an angle 108 with the energy dissipating basin floor 48. The angle adjustment is effectuated by having the angle adjustment locking element assembly 91 in an unlocked state and adjusting the threaded rod of the angle adjustment 88 by loosening the angle adjustment lock nuts 87 that are in the angle adjustment frame 89 to select the desired angle 108, then tightening the angle adjustment lock nuts 87 to the angle adjustment frame 89, then securing the channel deflector structure guide 78 through the use of the angle adjustment locking element assembly 91 that is then placed into the locked state to the angle adjustment frame 89, thus securing the selected angle 108 of the deflector structure 70. Further, the angle adjustment locking element assembly 91 could also utilize a plurality of epoxy anchors 84 in conjunction with a plurality of angle adjustment locking element assemblies 91 along the length of the channel deflector structure guide 78 with the epoxy anchors 84 attached to the energy dissipating basin sidewall 49 to further secure the selected angle 108 of the deflector structure 70. Alternatives to epoxy anchors 84 would be acceptable if they meet the aforementioned loading requirements.

Subsequently in FIG. 6, the means 71 for selectively adjustably positioning and securing the adjustably positioned deflector structure to the energy dissipating basin sidewall alternatively or in addition includes the capability of adjustably positioning the deflector structure 70 to selectably adjust the deflector structure 70 to a selected distance that is defined as dimension 104 above the energy dissipating basin floor 48. The means 71 for a selectively adjustably positioning and securing the deflector structure is preferably comprised of a channel deflector structure guide 78 being slidably engaged with the deflector structure 70 that allows the deflector structure 70 to slide within the channel deflector structure guide 78 allowing for variance in dimension 104. The preferred slidable engagement clearance between the channel deflector structure guide 78 that is slidably engaged with the deflector structure 70 is about ¼ in. which is shown with more clarity in FIG. 8. Returning to FIG. 6 the movement of the deflector structure 70 is accomplished by a floor distance adjustment 86 that is preferably constructed of a length of a threaded rod that is attached on one end to the deflector structure 70 and secured on an opposing end of the floor distance adjustment 86 to the channel deflector structure guide 78 by the use of adjustment lock nuts 87. In operation the floor distance adjustment 86 threaded rod is rotated until the selected distance of the deflector structure 70 above the energy dissipating basin floor 48 as indicated by dimension 104 is achieved, then the selected dimension 104 is fixed by the use of the adjustment lock nuts 87 that are secured to the channel deflector structure guide 78. Also, a locking element assembly 90 that is placed in the locked state can be utilized to lock the deflector structure 70 to secure the selected dimension 104 of the deflector structure 70 above the energy dissipating basin floor 48. The locking element assembly 90 is preferably constructed of a section of rod of which a portion is threaded wherein the threaded portion threadably engages a locking wedge assembly 92. The locking wedge assembly 92 is operational to expand and engage between the deflector structure 70 and the channel deflector structure guide 78 to secure the deflector structure 70 to the channel deflector structure guide 78 in a locked state thus helping to prevent relative movement of the slidable engagement between the deflector structure 70 and the channel deflector structure guide 78, with the result that the deflector structure 70 distance dimension 104 above the energy dissipating basin for 48 is secured. To adjust the deflector structure 70 distance dimension 104 above the energy dissipating basin floor 48 the locking wedge assembly 92 should be placed into an unlocked state and hence the locking element assembly 90 also being placed into the unlocked state by rotating the locking element assembly 90 to disengage the locking wedge assembly 92 from in between the channel deflector structure guide 78 and the deflector structure 70 thus allowing the deflector structure 70 to slidably engage within the deflector structure guide 78 resulting in the ability to select the height dimension 104 with the adjustment locknuts 87 loosened. To secure the selected height dimension 104 would be accomplished as previously described.

Another selected dimension 106 as shown in FIG. 6 is where the deflector structure 70 is positioned at a selected distance in dimension 106 that is from the deflector structure 70 to the energy dissipating basin outlet 56. Alternatively, the selected distance dimension 106 could be termed as the distance upstream from the energy dissipating basin outlet 56 to the deflector structure 70. Operationally, to set the selected dimension 106 requires specific positional placement of the channel structure guide trunnion 80 utilizing epoxy anchors 84 for attachment into the energy dissipating basin sidewall 49 at a specific location in combination with the selected angle 108 of the deflector structure 70. The selected angle 108 of the deflector structure 70 being accomplished as previously described. The combination of the deflector structure 70 selected angle 108, selected height dimension 104, and selected distance dimension 106 all act to optimize the functional performance of the deflector structure 70 in preventing the reverse flow component of the counter rotating eddy current as previously described.

Figure 7:
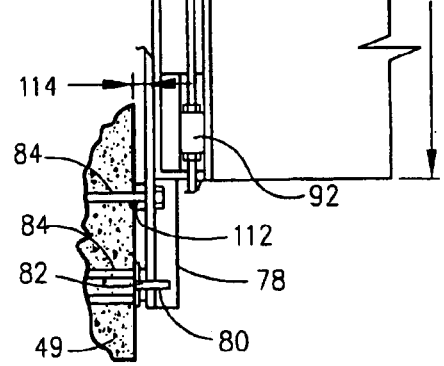
FIG. 7 shows a crossectional view of the means for adjustably positioning and securing the adjustably positioned deflector structure to the energy dissipating basin sidewall from the upstream side.

Next to FIG. 7 shown is a crossectional view of the means 71 for adjustably positioning and securing the adjustably positioned deflector structure 70 to the energy dissipating basin side wall 49 as viewed from the upstream side of the adjustably positioned baffle apparatus assembly 30, also note that the opposing energy dissipating basin side wall side is not shown. Additionally, the deflector structure that is adjustably positioned 70 with the deflector structure height dimension 102 is shown as it resides within the means 71 for selectively adjustably positioning and securing the adjustably positioned deflector structure 70 to the energy dissipating basin sidewall 49. The means 71 for a selectively adjustably positioning and securing the deflector structure is preferably comprised of a channel deflector structure guide 78 preferably constructed of a ½ in., ¾ in., and 1 in. combination steel plate weldment, with the channel deflector structure guide 78 being engaged or alternatively slidably engaged with the deflector structure 70, with the channel deflector structure guide 78 also being pivotally attached to the energy dissipating basin sidewall 49 on one end and adjustably attached to the energy dissipating basin sidewall 49 on the other end. The preferred slidable engagement clearance between the channel deflector structure guide 78 that is slidably engaged with the deflector structure 70 is about ¼ in. which is shown with more clarity in FIG. 8. Returning to FIG. 7 the pivotal attachment between the channel deflector structure guide 78 and the energy dissipating basin sidewall 49 is accomplished by a rotational engagement between a guide trunnion 80 in the channel structure guide 78 and a trunnion pin anchor 82, with the trunnion pin anchor 82 secured to the to the energy dissipating basin sidewall 49 by use of an epoxy anchor 84. Clearance spacing 114 between the channel structure guide 78 and the energy dissipating basin sidewall 49 is set or gauged by use of a spacer shim 112 to accommodate free pivotal movement at the aforementioned guide trunnion 80 in the channel structure guide 78 and the trunnion pin anchor 82. This allows the channel structure guide 78 to be selectively set at a desired angle, thus selectively setting the angle of the deflector structure 70. It is preferred that the clearance spacing 114 and hence the spacer shim 112 be about 1–½ in. in working distance between the channel structure guide 78 and the energy dissipating basin sidewall 49 for pivotal movement clearance. The adjustable attachment between the channel deflector structure guide 78 and the energy dissipating basin sidewall 49 is accomplished by the use a deflector structure angle adjustment (not shown) in conjunction with an angle adjustment locking element assembly 91 that is secured to an angle adjustment frame 89 that is in turn secured to the energy dissipating basin side wall 49 by also the use an epoxy anchor 84. The number of epoxy anchors 84 is determined by the loading imposed upon the entire adjustably positioned baffle apparatus assembly 30 from the downstream direction of flow by conventional engineering calculations. The angle adjustment locking element assembly 91 preferably utilizes any conventional attachment, such as a nut and bolt to secure the channel deflector structure guide 78 to the angle adjustment frame 89. However, any other form of deflector structure 70 angle adjustment mechanism and securing or locking element mechanism for the channel structure guide 78 to the energy dissipating basin sidewall 49 would be acceptable that accomplishes the same function as the aforementioned components.

In operationally physically adjusting the angle of the channel structure guide 78 and hence the deflector structure 70, the angle of concern is identified as angle 108 as shown in FIG. 6, which is basically the angle of the deflector structure 70 face 77 that corresponds to the deflector structure height dimension 102 as it forms an angle 108 as shown in FIG. 6 with the energy dissipating basin floor 48. The angle adjustment is effectuated by having the angle adjustment locking element assembly 91 in an unlocked state and adjusting the threaded rod of the angle adjustment (not shown) by loosening the angle adjustment lock nuts (not shown) that are in the angle adjustment frame 89 to select the desired angle 108 as shown in FIG. 6, then tightening the angle adjustment lock nuts (not shown) to the angle adjustment frame 89, then securing the channel deflector structure guide 78 through the use of the angle adjustment locking element assembly 91 that is then placed into the locked state to the angle adjustment frame 89, thus securing the selected angle 108 as shown in FIG. 6, of the deflector structure 70. Further, the angle adjustment locking element assembly 91 could also utilize a plurality of epoxy anchors 84 in conjunction with a plurality of angle adjustment locking element assemblies 91 along the length of the channel deflector structure guide 78 with the epoxy anchors 84 attached to the energy dissipating basin sidewall 49 to further secure the selected angle 108 as shown in FIG. 6 of the deflector structure 70. The number of epoxy anchors 84 is determined by the loading imposed upon the entire adjustably positioned baffle apparatus assembly 30 from the downstream direction of flow 36 by conventional engineering calculations. Alternatives to epoxy anchors 84 would be acceptable if they meet the aforementioned loading requirements.

Further in FIG. 7, the means 71 for selectively adjustably positioning and securing the adjustably positioned deflector structure to the energy dissipating basin sidewall alternatively or in addition includes the capability of adjustably positioning the deflector structure 70 to selectably adjust the deflector structure 70 to a selected distance that is defined as dimension 104 as shown in FIG. 6, above the energy dissipating basin floor 48 also as shown in FIG. 6. The means 71 for a selectively adjustably positioning and securing the deflector structure is preferably comprised of a channel deflector structure guide 78 that is slidably engaged with the deflector structure 70 that allows the deflector structure 70 to slide within the channel deflector structure guide 78 allowing for variance in dimension 104 as shown in FIG. 6. The movement of the deflector structure 70 is accomplished by a floor distance adjustment (not shown) that is preferably constructed of a length of the threaded rod that is attached on one end to the deflector structure 70 and secured on an opposing end of the floor distance adjustment (not shown) to the channel deflector structure guide 78 by the use of adjustment lock nuts (not shown). In operation the floor distance adjustment (not shown) threaded rod is rotated until the selected distance of the deflector structure 70 above the energy dissipating basin floor as shown in FIG. 6 as indicated by dimension 104 also as shown in FIG. 6 is achieved, then the selected dimension 104 as shown in FIG. 6 is fixed by the use of the adjustment lock nuts (not shown) that are secured to the channel deflector structure guide 78. Also, a locking element assembly 90 that is placed in the locked state can be utilized to lock the deflector structure 70 to secure the selected dimension 104 as shown in FIG. 6 of the deflector structure 70 above the energy dissipating basin floor 48 as shown in FIG. 6. The locking element assembly 90 is preferably constructed of a section of rod of which a portion is threaded wherein the threaded portion threadably engages a locking wedge assembly 92. The locking wedge assembly 92 is operational to expand and engage between the deflector structure 70 and the channel deflector structure guide 78 to secure the deflector structure 70 to the channel deflector structure guide 78 in a locked state thus helping to prevent relative movement of the slidable engagement between the deflector structure 70 and the channel deflector structure guide 78, with the result that the deflector structure 70 distance dimension 104 as shown in FIG. 6 above the energy dissipating basin for 48 as shown in FIG. 6 is secured. A plurality of locking wedge assemblies 92 can be used to secure by expanding and engaging between the deflector structure 70 and the channel deflector structure guide 78 in multiple locations to further secure the deflector structure 70 to the channel deflector structure guide 78 in a locked state. To adjust the deflector structure 70 distance dimension 104 as shown in FIG. 6 above the energy dissipating basin floor 48 as shown in FIG. 6 the locking wedge assembly 92 should be placed into an unlocked state and hence the locking element assembly 90 also being placed into the unlocked state by rotating the locking element assembly 90 to disengage the locking wedge assembly 92 from in between the channel deflector structure guide 78 and the deflector structure 70 thus allowing the deflector structure 70 to slidably engage within the deflector structure guide 78 resulting in the ability to select the height dimension 104 as shown in FIG. 6 with the adjustment lock nuts loosened (not shown). To secure the selected height dimension 104 as shown in FIG. 6 would be accomplished as previously described.

Figure 8:
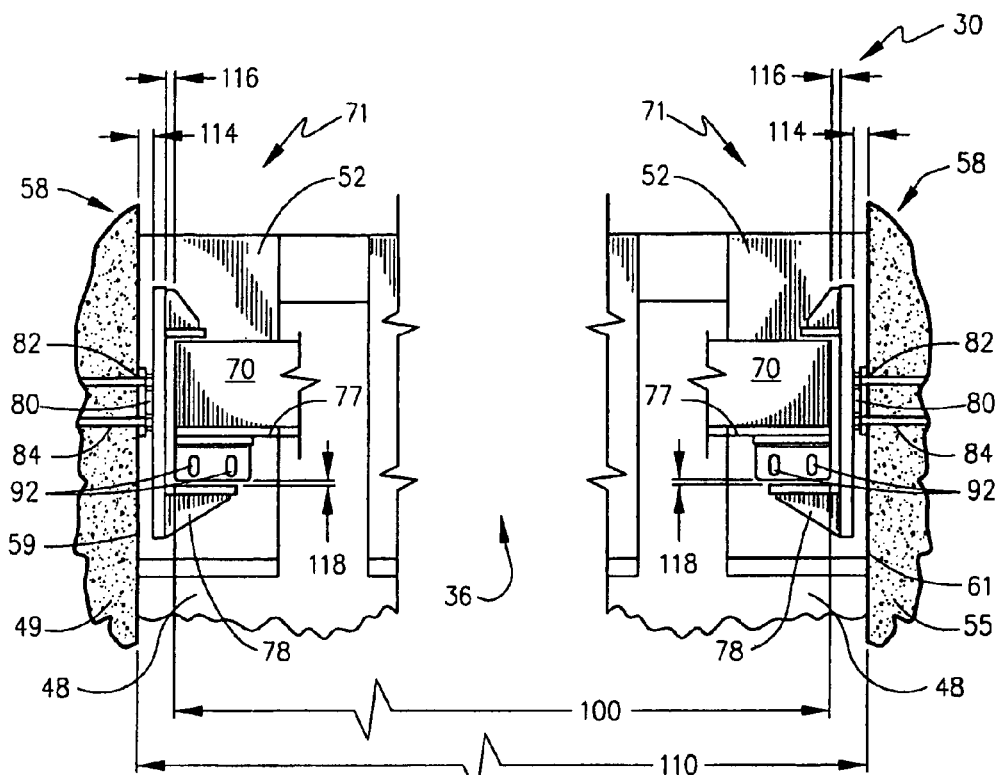
FIG. 8 shows a plan view of the adjustably positioned baffle apparatus assembly.

Next to FIG. 8 shown is a plan view of the adjustably positioned baffle apparatus assembly 30 and the means 71 for adjustably positioning and securing the adjustably positioned deflector structure 70 to the energy dissipating basin side wall 49 that extends from an edge 59 of the energy dissipating basin floor 48 and can also be across the energy dissipating basin span dimension 110 to the opposing energy dissipating basin sidewall 55 that extends from an opposing edge 61 of the energy dissipating basin floor 48. For orientation purposes in the plan view the downstream direction flow 36 and the energy dissipating basin end sill 52 are shown in conjunction with the energy dissipating basin sidewall 49 and the opposing energy dissipating basin sidewall 55. Additionally, the deflector structure that is adjustably positioned 70 with the deflector structure span dimension 100 is shown as it resides within the means 71 for selectively adjustably positioning and securing the adjustably positioned deflector structure 70 between the energy dissipating basin sidewall 49 and the opposing energy dissipating basin sidewall 55 with the deflector structure span dimension 100 being close to the energy dissipating basin span 110 between the energy dissipating basin sidewall 49 and the opposing energy dissipating basin sidewall 55. The deflector structure 70 and in particular the deflector structure face 77 is adjustably positioned substantially transverse to the downstream direction flow 36 in the open flow channel energy dissipating basin 58. The means 71 for a selectively adjustably positioning and securing the deflector structure 70 is preferably comprised of a channel deflector structure guide 78 that is engaged or alternatively slidably engaged with the deflector structure 70, with the channel deflector structure guide 78 also being pivotally attached to the energy dissipating basin sidewall 49 on one end and adjustably attached (not shown) to the energy dissipating basin sidewall 49 on the other end. Also, as shown in FIG. 8, the means 71 for a selectively adjustably positioning and securing the deflector structure 70 that is preferably comprised of a channel deflector structure guide 78 being engaged or alternatively slidably engaged with the deflector structure 70, with the channel deflector structure guide 78 can also be pivotally attached to the opposing energy dissipating basin sidewall 55 on one end and adjustably attached (not shown) to the opposing energy dissipating basin sidewall 55 on the other end. The preferred slidable engagement clearance 116 between the channel deflector structure guide 78 that is slidably engaged with the deflector structure 70 is about ¼ in. The pivotal attachment between the channel deflector structure guide 78 and the energy dissipating basin sidewall 49 and can also include the opposing energy dissipating basin sidewall 55 and is accomplished by a rotational engagement between a guide trunnion 80 in the channel structure guide 78 and a trunnion pin anchor 82, with the trunnion pin anchor 82 secured to the to the energy dissipating basin sidewall 49 by use of an epoxy anchor 84. Clearance spacing 114 between the channel structure guide 78 and the energy dissipating basin sidewall 49 and can also include the opposing energy dissipating basin sidewall 55 and is set or gauged by use of a spacer shim (not shown) to accommodate free pivotal movement at the aforementioned guide trunnion 80 in the channel structure guide 78 and the trunnion pin anchor 82. This allows the channel structure guide 78 to be selectively set at a desired angle, thus selectively setting the angle of the deflector structure 70. It is preferred that the clearance spacing 114 and hence the spacer shim (not shown) be about 1–½ in. in working distance between the channel structure guide 78 and the energy dissipating basin sidewall 49 and can also include the opposing energy dissipating basin sidewall 55 for pivotal movement clearance. The number of epoxy anchors 84 is determined by the loading imposed upon the entire adjustably positioned baffle apparatus assembly 30 from the downstream direction of flow by conventional engineering calculations. Alternatives to epoxy anchors 84 would be acceptable if they meet the aforementioned loading requirements.

Further in FIG. 8, the means 71 for selectively adjustably positioning and securing the adjustably positioned deflector structure to the energy dissipating basin sidewall alternatively or in addition includes the capability of adjustably positioning the deflector structure 70 to selectably adjust the deflector structure 70 to a selected distance that is defined as dimension 104 as shown in FIG. 6, above the energy dissipating basin floor 48 also as shown in FIG. 6. The means 71 for a selectively adjustably positioning and securing the deflector structure is preferably comprised of a channel deflector structure guide 78 that is slidably engaged with the deflector structure 70 that allows the deflector structure 70 to slide within the channel deflector structure guide 78 allowing for variance in dimension 104 as shown in FIG. 6. The movement of the deflector structure 70 is accomplished by a floor distance adjustment (not shown) that is preferably constructed of a length of the threaded rod that is attached on one end to the deflector structure 70 and secured on an opposing end of the floor distance adjustment (not shown) to the channel deflector structure guide 78 by the use of adjustment lock nuts (not shown). In operation the floor distance adjustment (not shown) threaded rod is rotated until the selected distance of the deflector structure 70 above the energy dissipating basin floor 48 as shown in FIG. 6 as indicated by dimension 104 also as shown in FIG. 6 is achieved, then the selected dimension 104 as shown in FIG. 6 is fixed by the use of the adjustment lock nuts (not shown) that are secured to the channel deflector structure guide 78. Also, a locking element assembly (not shown) that is placed in the locked state can be utilized to lock the deflector structure 70 to secure the selected dimension 104 as shown in FIG. 6 of the deflector structure 70 above the energy dissipating basin floor 48 as shown in FIG. 6. The locking element assembly (not shown) is preferably constructed of a section of rod of which a portion is threaded wherein the threaded portion threadably engages a locking wedge assembly 92. The locking wedge assembly 92 is operational to expand and engage between the deflector structure 70 and the channel deflector structure guide 78 to secure the deflector structure 70 to the channel deflector structure guide 78 in a locked state thus helping to prevent relative movement of the slidable engagement between the deflector structure 70 and the channel deflector structure guide 78, with the result that the deflector structure 70 distance dimension 104 as shown in FIG. 6 above the energy dissipating basin floor 48 as shown in FIG. 6 is secured. A plurality of locking wedge assemblies 92 can be used to secure by expanding and engaging between the deflector structure 70 and the channel deflector structure guide 78 in multiple locations to further secure the deflector structure 70 to the channel deflector structure guide 78 in a locked state. The preferred total clearance 118 between the locking wedge assembly 92 in an unlocked state and the channel deflector structure guide 78 is about ⅜ in. To adjust the deflector structure 70 distance dimension 104 as shown in FIG. 6 above the energy dissipating basin floor 48 as shown in FIG. 6 the locking wedge assembly 92 should be placed into an unlocked state and hence the locking element assembly (not shown) also being placed into the unlocked state by rotating the locking element assembly (not shown) to disengage the locking wedge assembly 92 from in between the channel deflector structure guide 78 and the deflector structure 70 thus allowing the deflector structure 70 to slidably engage within the deflector structure guide 78 resulting in the ability to select the height dimension 104 as shown in FIG. 6 with the adjustment lock nuts loosened (not shown). To secure the selected height dimension 104 as shown in FIG. 6 would be accomplished as previously described.

Continuing to FIG. 9 shown is a side view of the fixedly positioned baffle apparatus assembly 32 from the opposing energy dissipating basin sidewall side (not shown). For orientation purposes a portion of the open flow channel energy dissipating basin is shown that includes the energy dissipating basin floor 48, the end sill 52, the energy dissipating basin outlet 56, the energy dissipating basin sidewall 49, and the energy dissipating basin interior 50. Additionally, the downstream direction of flow 36 is also shown. Also, the deflector structure that is fixedly positioned 72 with the deflector structure height dimension 102 is shown as it is attached the means 73 for fixedly positioning and securing the fixedly positioned deflector structure 72 to the energy dissipating basin sidewall 49. The means 73 for a fixedly positioning and securing the deflector structure is preferably comprised of a deflector structure support 94 that is sized and constructed based upon conventional engineering calculations and fabrication methods for the aforementioned deflector structure 72 loading and is preferably comprised of a channel deflector structure support 94 preferably constructed of a ½ in., ¾ in., and 1 in. combination steel plate weldment that is attached the deflector structure 72 by any conventional method of welding, bolting, or any other suitable attachment method for the aforementioned loading due to the downstream direction of flow 36 by conventional engineering calculations. The attachment between the deflector structure support 94 and the energy dissipating basin sidewall 49 is accomplished by the use of an epoxy anchor 84. The number of epoxy anchors 84 is determined by the loading imposed upon the entire fixedly positioned baffle apparatus assembly 32 from the aforementioned downstream direction of flow 36 by conventional engineering calculations. Alternatives to epoxy anchors 84 would be acceptable if they meet the aforementioned loading requirements.

In operationally physically setting the angle of the deflector structure support 94 and hence the deflector structure 72, the angle of concern is identified as angle 108 as shown in FIG. 9, which is basically the angle of the deflector structure 72 face 79 that corresponds to the deflector structure height dimension 102 as it forms an angle 108 with the energy dissipating basin floor 48. The angle 108 setting is selectively determined from testing using a series of velocity profiles to optimize the selected angle 108 as detailed in the method of use. Subsequently in FIG. 9, the means 73 for fixedly positioning and securing the deflector structure 72 to the energy dissipating basin sidewall 49 includes selectively positioning the deflector structure 72 to a selected distance that is defined as dimension 104 above the energy dissipating basin floor 48. The dimension 104 setting is also selectively determined from testing using a series of velocity profiles to optimize the selected dimension 104 as detailed in the method of use. Another selected dimension 106 as shown in FIG. 9 is where the deflector structure 72 is positioned at a selected distance in dimension 106 that is from the deflector structure 72 to the energy dissipating basin outlet 56. Alternatively, the selected distance dimension 106 could be termed as the distance upstream from the energy dissipating basin outlet 56 to the deflector structure 72. The dimension 106 setting is again selectively determined from testing using a series of velocity profiles to optimize the selected dimension 106 as detailed in the method of use. The combination of the deflector structure 72 selected angle 108, selected height dimension 104, and selected distance dimension 106 all act to optimize the functional performance of the deflector structure 72 in preventing the reverse flow component of the counter rotating eddy current as previously described.

Further continuing to FIG. 10 shown is a crossectional view of the fixedly positioned baffle apparatus assembly 32 and the means 73 for fixedly positioning and securing the fixedly positioned deflector structure 72 to the energy dissipating basin side wall 49 from the upstream side, also note that the opposing energy dissipating basin side wall side is not shown. Additionally, the deflector structure that is fixably positioned 72 with the deflector structure height dimension 102 and deflector structure face 79 is shown as it resides within the means 73 for fixedly positioning and securing the fixedly positioned deflector structure 72 to the energy dissipating basin sidewall 49. The means 73 for a fixedly positioning and securing the deflector structure is preferably comprised of a deflector structure support 94 being preferably constructed of a channel with mounting plate or other suitable alternative for the described loading that is attached the deflector structure 72 by any conventional method of welding, bolting, or any other suitable attachment method for the loading due to the downstream direction of flow (not shown) by conventional engineering calculations. The attachment between the deflector structure support 94 and the energy dissipating basin sidewall 49 is preferably accomplished by the use of an epoxy anchor 84. The number of epoxy anchors 84 is determined by the loading imposed upon the entire fixedly positioned baffle apparatus assembly 32 from the downstream direction of flow 36 by conventional engineering calculations. Alternatives to epoxy anchors 84 would be acceptable if they meet the aforementioned loading requirements.

Figure 11:
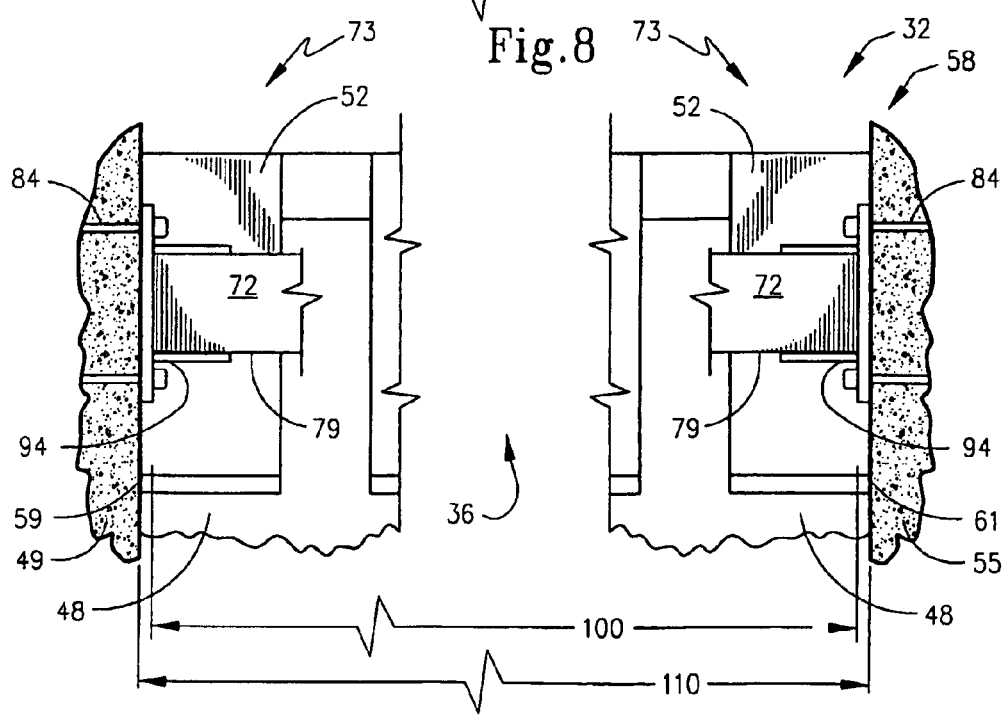
FIG. 11 shows a plan view of the fixedly positioned baffle apparatus assembly.

Finally to FIG. 11 shown is a plan view of the fixedly positioned baffle apparatus assembly 32 and the means 73 for fixedly positioning and securing the fixedly positioned deflector structure 72 to the energy dissipating basin side wall 49 that extends upward from an edge 59 of the energy dissipating basin floor 48 and can also be across the energy dissipating basin span dimension 110 to the opposing energy dissipating basin sidewall 55 that extends upward from an opposing edge 61 of the energy dissipating basin floor 48. For orientation purposes in the plan view the downstream direction flow 36 and the energy dissipating basin end sill 52 are shown in conjunction with the energy dissipating basin sidewall 49 and the opposing energy dissipating basin sidewall 55. Additionally, the deflector structure that is fixedly positioned 72 with the deflector structure span dimension 100 is shown as it resides within the means 73 for fixedly positioning and securing the fixedly positioned deflector structure 72 between the energy dissipating basin sidewall 49 and the opposing energy dissipating basin sidewall 55 with the deflector structure span dimension 100 being close to the energy dissipating basin span 110 between the energy dissipating basin sidewall 49 and the opposing energy dissipating basin sidewall 55. The deflector structure 72 and in particular the deflector structure face 79 is fixedly positioned substantially transverse to the downstream direction flow 36 in the open flow channel energy dissipating basin 58. The means 73 for a selectively fixedly positioning and securing the deflector structure 72 is preferably comprised of a deflector structure support 94 being preferably constructed of a channel with mounting plate or other suitable alternative for the described loading that is attached the deflector structure 72 by any conventional method of welding, bolting, or any other suitable attachment method for the loading due to the downstream direction of flow 36 by conventional engineering calculations. The attachment between the deflector structure support 94 and the energy dissipating basin sidewall 49 is preferably accomplished by the use of an epoxy anchor 84. The number of epoxy anchors 84 is determined by the loading imposed upon the entire fixedly positioned baffle apparatus assembly 32 from the downstream direction of flow 36 by conventional engineering calculations. Alternatives to epoxy anchors 84 would be acceptable if they meet the aforementioned loading requirements. Note that the deflector structure support 94 can also be attached to the opposing energy dissipating basin sidewall 55 in a manner like that described for the deflector structure support 94 attachment to the energy dissipating basin side wall 49. Also, the attachment between the deflector structure 72 and the deflector structure support 94 for the opposing energy dissipating basin sidewall 55 is also in a like manner as that described for the attachment between the deflector structure 72 and the deflector structure support 94 for the energy dissipating basin sidewall 49.

METHOD OF USE

Referring to FIGS. 1, 2, 6, 7, and 8 a method is disclosed for optimizing the position of a selectively adjustably positioned baffle apparatus 30 for the purpose of directing fluid 34 flow 57 to reduce damage 60 to an open flow channel energy dissipating basin 58 that includes an inlet 54, an outlet 56, a floor 48, a sidewall 49 that extends upward from an edge 59 of the floor 48, and an opposing sidewall 55 that extends upward from an opposing edge 61 of the floor 48 defining an open flow channel energy dissipating basin 58 interior 50 with a energy dissipating basin span 110 between the sidewall 49 and the opposing sidewall 55. The first step is to provide a baffle apparatus 30 that includes a deflector structure 70 that is generally planar and is adjustably positioned substantially transverse to a downstream direction flow 36 in the energy dissipating basin 58. The deflector structure 70 spans between the sidewall 49 and the opposing sidewall 55 above the floor 48. Also provided is a means 71 for selectively adjustably positioning and securing the deflector structure 70 to the sidewall 49, wherein the deflector structure 70 directs flow 57 in the energy dissipating basin 58 to flow in a downstream direction 36 from a reverse upstream direction 38 adjacent to the floor 48.

The next step is to determine a range of fluid flowrates that can occur in the energy dissipating basin 58 corresponding to a minimum fluid flow rate and a maximum fluid flow rate present at the energy dissipating basin inlet 54. The range of fluid 34 flowrates from minimum to maximum is typically divided into 20% increments thus scaling flowrates at 0%, 20%, 40%, 60%, 80%, and 100% with measurements typically taken at but not limited to being 20%, 40%, 60%, 80%, and 100% which also correspond to the same % gate openings. The following test data was collected from a constructed test model that is a 1:7 physical model of the actual open flow channel energy dissipating basin 58 with the test outlet works being 2 feet 9 in. wide by 2 feet 9 in. high pressure gates discharging into 2:1 slopping twin chutes. The test model also includes a hydraulic jump twin bay stilling basin with 85 feet of downstream stilling basin topography. The test model apron 64 or streambed adjacent to the energy dissipating basin outlet 56 was modeled with movable streambed material 66. Test model data collected includes covering the aforementioned selected range of fluid 34 flowrates for specific fluid 34 velocity data, dye streak line data, and streambed material 66 movement data. The test model fluid 34 was water. The aforementioned test model data was used to determine an optimum deflector structure 70 positioning as subsequently described and deflector structure 70 geometry, namely the deflector structure 70 height dimension 102 to eliminate the depositing of stream bed materials 66 into the open flow channel energy dissipating basin interior 50. On the following FIGS. 12 through 28 descriptions unless otherwise specified, the deflector structure 70 height dimension 102 is 5 feet and the dimension 106 that goes from the energy dissipating basin outlet 56 in an upstream flow direction 38 to the deflector structure 70 is 5 feet.

Subsequently, the next step is to measure fluid velocity profiles corresponding to the minimum fluid flow rate adjacent to the energy dissipating basin floor 48, adjacent to a fluid free surface 46, and at a plurality of points intermediate to or between the adjacent to the energy dissipating basin floor 48 velocity profile and the adjacent to the fluid free surface 46 velocity profile, with the fluid velocity profiles to be taken adjacent to the energy dissipating basin outlet 56. Further, the next step is to measure fluid average velocity profiles corresponding to the maximum fluid flow rate adjacent to the energy dissipating basin floor 48, adjacent to a fluid free surface 46, and at a plurality of points intermediate to or between the adjacent to the energy dissipating basin floor 48 velocity profile and the adjacent to the fluid free surface 46 velocity profile, the fluid velocity profiles to be taken adjacent to the energy dissipating basin outlet 56. A further subsequent step is to measure fluid velocity profiles corresponding to a plurality of selected fluid flowrates between the minimum fluid flow rate and the maximum fluid flow rate, for each selected fluid flow rate measuring fluid velocity profiles adjacent to the energy dissipating basin floor 48, adjacent to a fluid free surface 46, and at a plurality of points intermediate to or between the adjacent to the energy dissipating basin floor 48 velocity profile and the adjacent to the fluid free surface 46 velocity profile, the fluid velocity profiles to be taken adjacent to the energy dissipating basin outlet 56.

Figure 12:
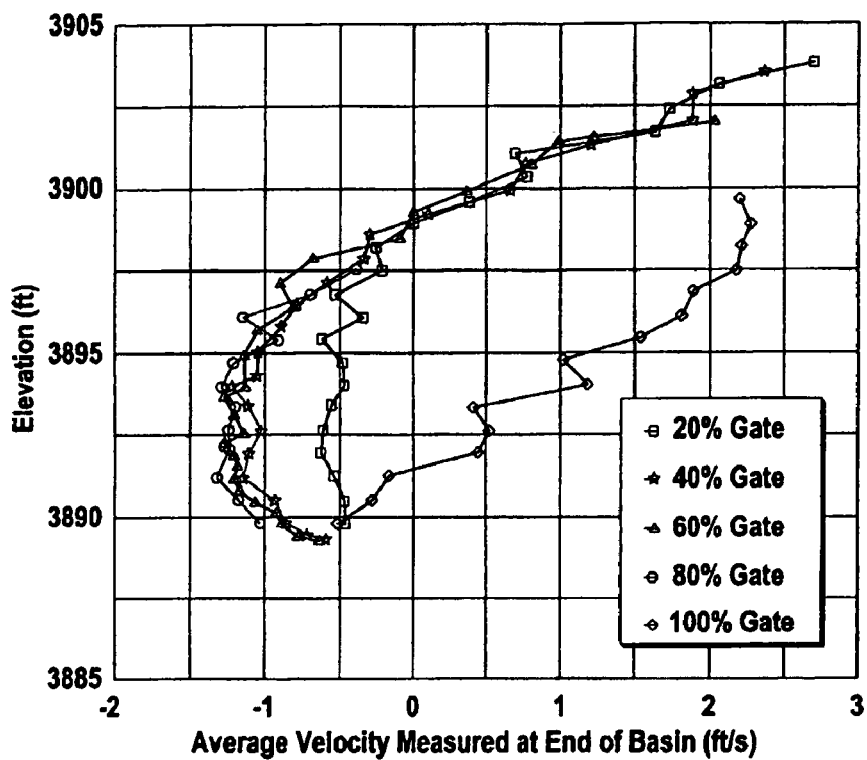
FIG. 12 shows velocity profiles without the deflector structure measured at the energy dissipating basin outlet for the identified gate openings.

After the velocity profile data is taken the next step is to map a composite fluid velocity profile adjacent to the energy dissipating basin outlet for each of the minimum fluid flow rate, maximum fluid flow rate, and the selected fluid flow rates between the minimum fluid flow rate and the maximum fluid flow rate. FIG. 12 shows a typical composite fluid velocity profile without the deflector structure 70 installed in the open flow channel energy dissipating basin 58 for fluid velocities measured at the end of the basin or adjacent to the energy dissipating basin outlet 56. The elevation in feet is equivalent to varying the height or distance 104 between the deflector structure 70 and the energy dissipating basin floor 48. The fluid velocity equaling zero is the transition point with negative velocities denoting upstream direction flow 38 and positive velocities denoting downstream direction flow 36. The energy dissipating basin floor 48 has an elevation of 3889.00 feet.

FIG. 12 shows velocity profiles without the deflector structure 70 measured at the energy dissipating basin outlet 56 for identified gate openings. The next step in observing FIG. 12 is to determine from the composite fluid velocity profiles in FIG. 12 for each of the minimum fluid flow rate, maximum fluid flow rate, and the selected fluid flow rates between the minimum fluid flow rate and the maximum fluid flow rate, the location and magnitude of counter rotating eddys and in particular a transition point location for each of the minimum, maximum, and other selected fluid flow rates, wherein each of the said transition points is defined as a direction of a fluid flow velocity reversal going from a downstream direction of flow 36 to an upstream direction of flow 38 at the energy dissipating basin outlet 56, thus producing a plurality of transition point locations corresponding to each of a plurality of selected fluid flow rates. It can be observed from FIG. 12 that the velocity transition points 43 vary with the fluid flow rate which complicates the function of the baffle apparatus 30 in that the transition points need to be eliminated or reduced to a minimum at all fluid flow rates resulting in a downstream direction of flow 36 at all or almost all flowrates to minimize the energy dissipating basin damage 60. Also observed from FIG. 12 is that high fluid flow rates have a lower transition point 43 or closer to the energy dissipating basin floor 48 and that as the fluid flow rate is decreased the transition point 43 moves upward or further from the energy dissipating basin floor 48. This is because the thickness or height of the downstream direction of flow 36 increases as the fluid flow rate increases thus lowering the transition point 43 toward the energy dissipating basin floor 48.

The final step is in positioning the baffle apparatus 30 such that the baffle apparatus 30 engages all or almost all of the transition point 43 locations from the different aforementioned selected fluid flowrates resulting in a portion of the downstream direction fluid flow 36 velocity being directed to produce a downstream direction fluid flow 36 velocity adjacent to the floor 48 of the energy dissipating basin outlet 56 at each of or most of the plurality of fluid flow rates. This results in eliminating all or most of the transition point 43 locations and upstream direction fluid flow 38 velocity adjacent to the floor 48 of the energy dissipating basin outlet 56 for the minimum fluid flow rate, the maximum fluid flow rate, and all of the selected intermediate fluid flow rates between the minimum fluid flow rate and the maximum fluid flow rate. Positioning the baffle apparatus 30 is broken down into a number of attributes, starting with the deflector structure 70 itself which normally has a span 100 that is close to the energy dissipating basin span 110 and a deflector structure height 102 that was varied in the testing but is not limited to a 3 foot, 4 foot, or 5 foot height 102. Another attribute is to vary the angle 108 of the deflector structure 70 as related or measured between the face 77 of the deflector structure 70 and the energy dissipating basin floor 48, the angle 108 was varied in the testing but is not limited to 40 degrees, 60, degrees, 70 degrees, 80 degrees, and 90 degrees. A further attribute is to vary height or dimension 104 of the deflector structure 70 above the energy dissipating basin floor 48, for the testing the dimension 104 was varied but is not limited to 3.88 feet to 14.37 feet, which corresponds to a energy dissipating basin floor 48 elevation of 3889.00 feet, a minimum test elevation of 3892.88 feet and a maximum test elevation of 3903.37 feet. A final attribute is to vary the distance from the energy dissipating basin outlet 56 in the upstream flow direction 38 to the deflector structure 70 known as dimension 106, which was varied but is not limited to going from 1.5 feet to 14 feet.

Figure 13:
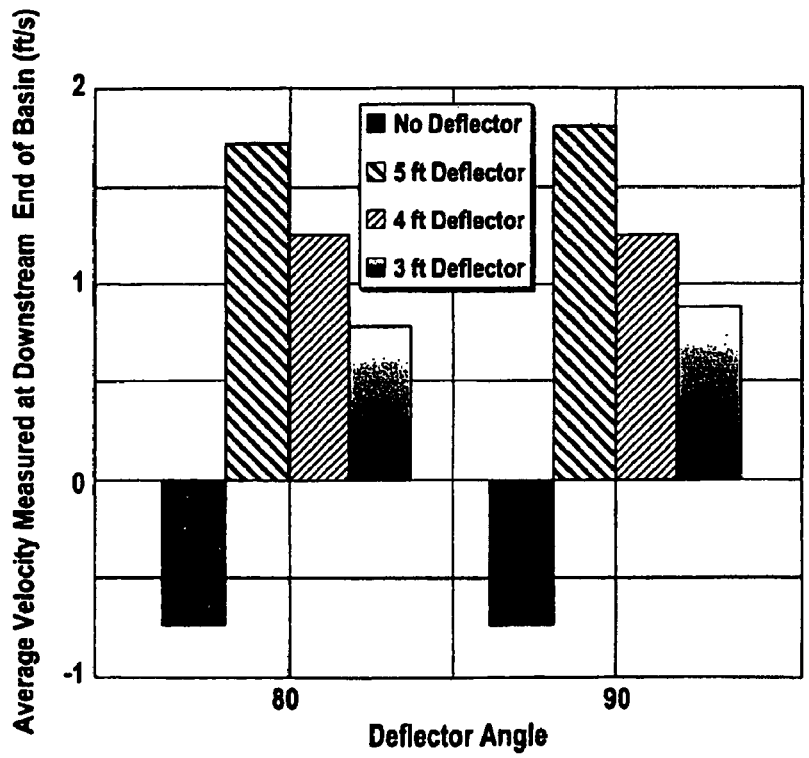
FIG. 13 shows average velocity versus deflector structure face angle for different height dimension deflector structures positioned at an elevation of 3900 feet and operating at 40% gate opening.
Figure 14:
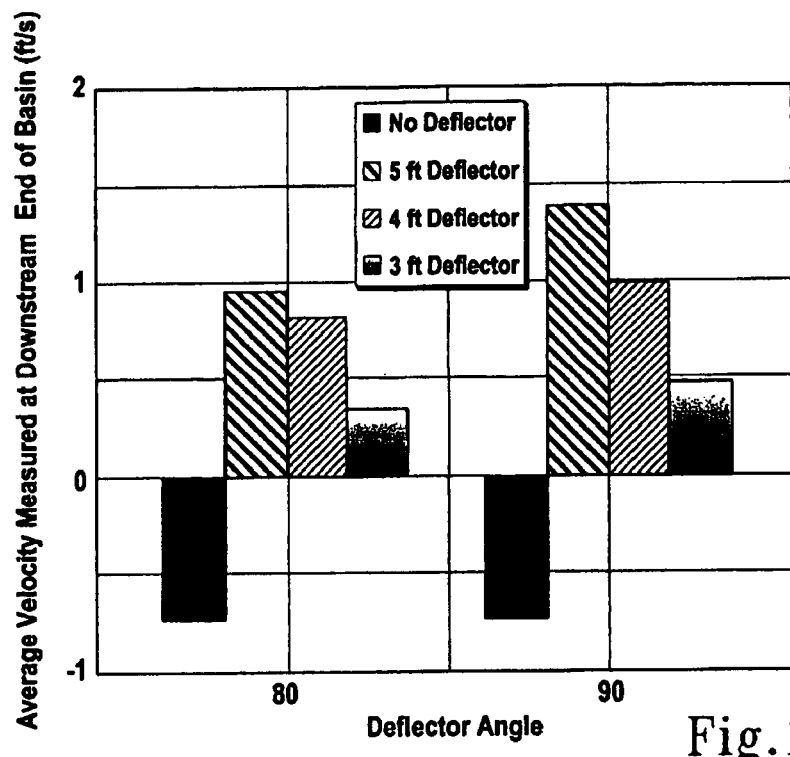
FIG. 14 shows average velocity versus deflector structure face angle to the energy dissipating basin floor for different baffle height dimension deflector structures positioned at an elevation of 3900 feet and operating at 60% gate opening.

FIGS. 13 and 14 show a variable deflector structure 70 height dimension 102 at 3 feet, 4 feet, and 5 feet with a variable deflector structure 70 face 77 angle 108 in relation to the energy dissipating basin floor 48 of 80 degrees and 90 degrees for flowrates of 40% gate opening and 60% gate opening. Data is also shown without a deflector structure 70 in place. It can be observed that the 5 feet deflector structure 70 height dimension 102 provides the highest downstream direction flow 36 velocity providing the largest safety margin from undesirable upstream direction flow 38.

FIG. 13 shows average velocity versus deflector structure 70 face 77 angle 108 for different dimension 102 deflector structures 70 positioned at an elevation of 3900 feet and operating at 40% gate opening.

FIG. 14 shows average velocity versus deflector structure 70 face 77 angle 108 for different dimension 102 deflector structures 70 positioned at an elevation of 3900 feet and operating at 60% gate opening.

Figure 15:
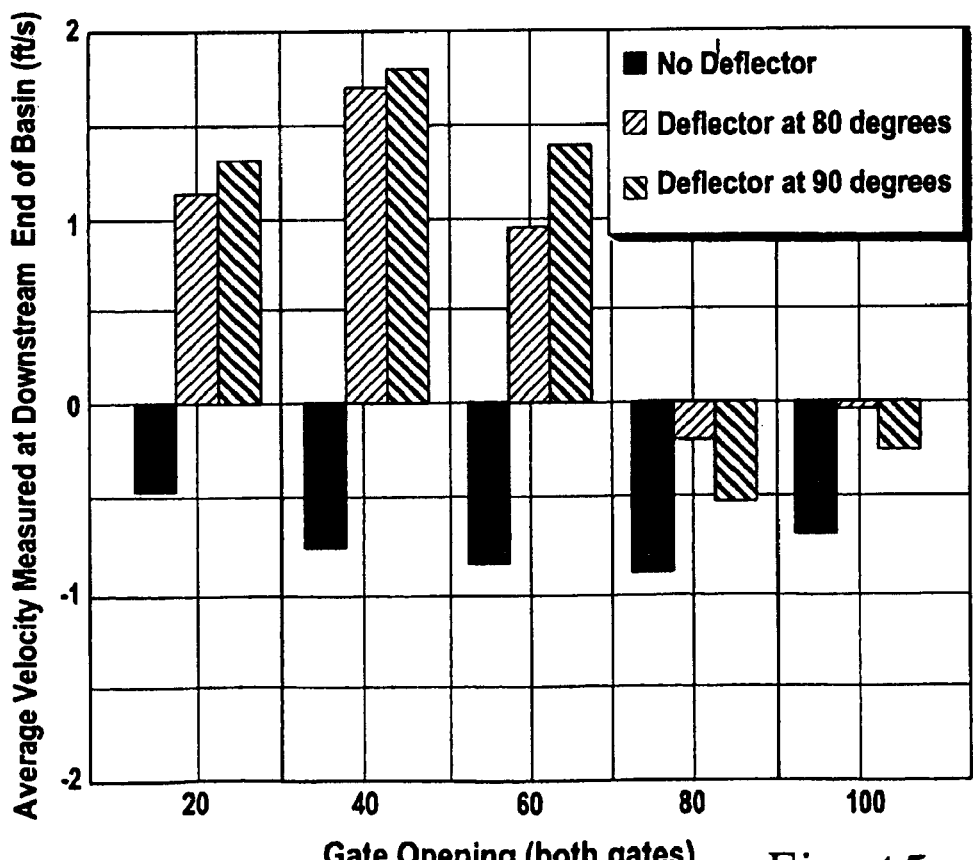
FIG. 15 shows the deflector structure face angle to the energy dissipating basin floor at 80 degrees allowing the lowest magnitude of upstream direction flow at near maximum gate openings.

FIG. 15 indicates that the deflector structure 70 face 77 angle 108 at 80 degrees allowing the lowest magnitude of upstream direction flow 38 at near maximum gate openings. FIG. 15 also shows average velocity versus gate opening for without the deflector structure 70 and with the deflector structure 70 positioned at an elevation of 3900 feet and the deflector structure 70 face 77 angled 108 at 80 degrees and 90 degrees.

Figure 16:
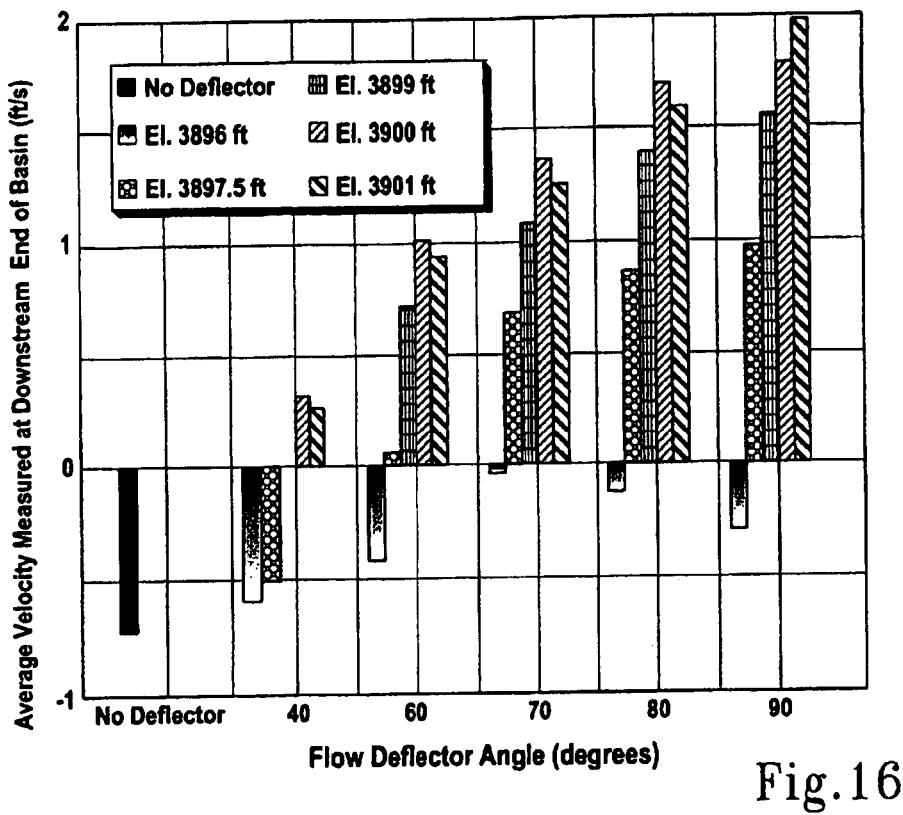
FIG. 16 shows the optimum deflector structure face angle to the energy dissipating basin floor is 90 degrees at an elevation of 3901 feet resulting in the highest magnitude of downstream direction flow velocity at 40% gate opening.

FIG. 16 indicates that the optimum deflector structure 70 face 77 angle 108 is 90 degrees at an elevation of 3901 feet resulting in the highest magnitude of downstream direction flow 36 velocity at 40% gate opening. FIG. 16 also shows average velocity versus deflector structure 70 face 77 angled 108 from 40 degrees to 90 degrees positioned at dimension 106 being 5 feet from the energy dissipating basin outlet 56 going in the upstream flow direction 38 to the deflector structure 70 at 40% gate opening for varying elevations corresponding to dimension 104 going from 7 feet to 12 feet. Data is also shown without the deflector structure 70.

Figure 17:
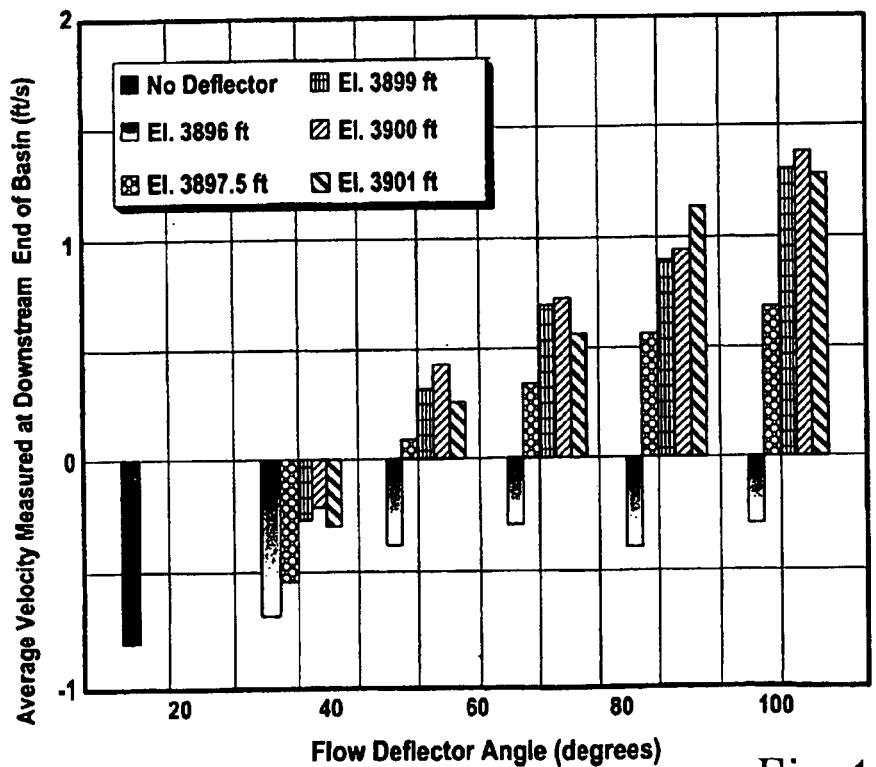
FIG. 17 shows the optimum deflector structure face angle to the energy dissipating basin floor is 90 degrees at an elevation of 3900 feet resulting in the highest magnitude of downstream direction flow velocity at 60% gate opening.

FIG. 17 indicates that the optimum deflector structure 70 face 77 angle 108 is 90 degrees at an elevation of 3900 feet resulting in the highest magnitude of downstream direction flow 36 velocity at 60% gate opening. FIG. 17 also shows average velocity versus deflector structure 70 face 77 angled 108 from 40 degrees to 90 degrees positioned at dimension 106 being 5 feet from the energy dissipating basin outlet 56 going in the upstream flow direction 38 to the deflector structure 70 at 60% gate opening for varying elevations corresponding to dimension 104 going from 7 feet to 12 feet. Data is also shown without the deflector structure 70.

Figure 18:
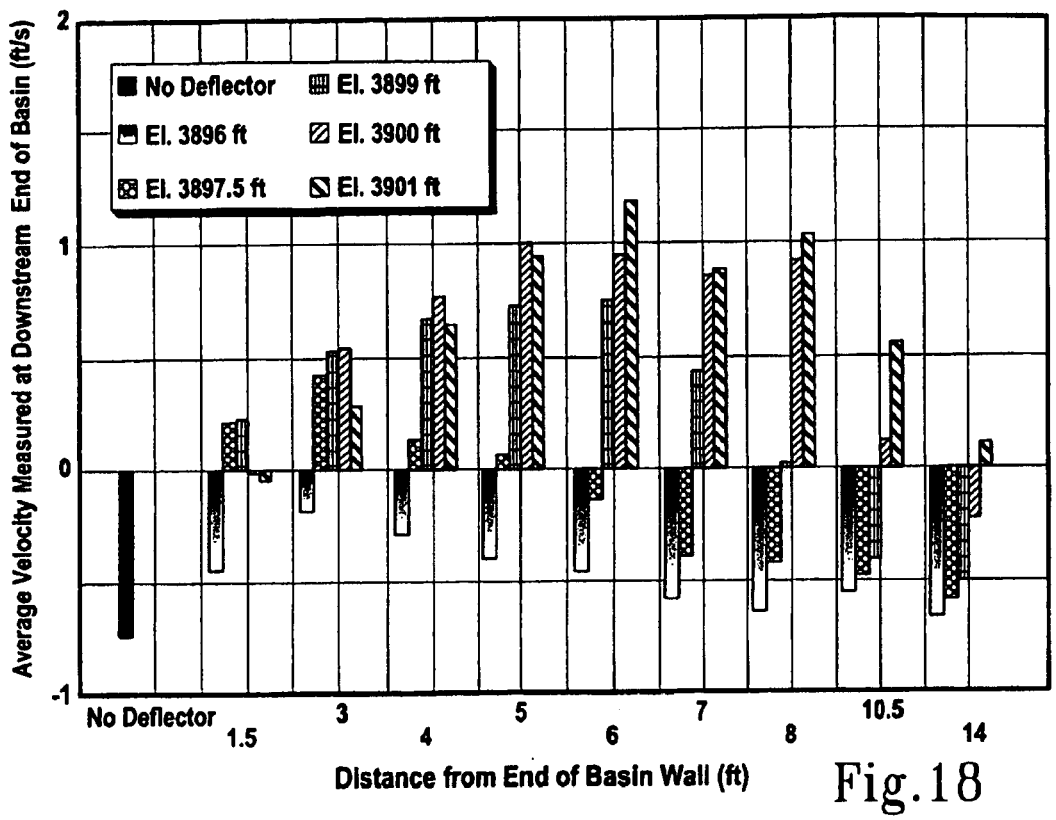
FIG. 18 shows the optimum deflector structure dimension that is upstream from the energy dissipating basin outlet is at 6 feet for an elevation of 3901 feet resulting in the highest magnitude of downstream direction flow velocity at 40% gate opening.

FIG. 18 indicates that the optimum deflector structure 70 dimension 106 is at 6 feet for an elevation of 3901 feet resulting in the highest magnitude of downstream direction flow 36 velocity at 40% gate opening. FIG. 18 also shows average velocity versus deflector structure 70 positioning at dimension 106 being from the energy dissipating basin outlet 56 going in the upstream flow direction 38 to the deflector structure 70 with the deflector structure 70 face 77 angled 108 at 60 degrees at 40% gate opening. Data is also shown without the deflector structure 70.

Figure 19:
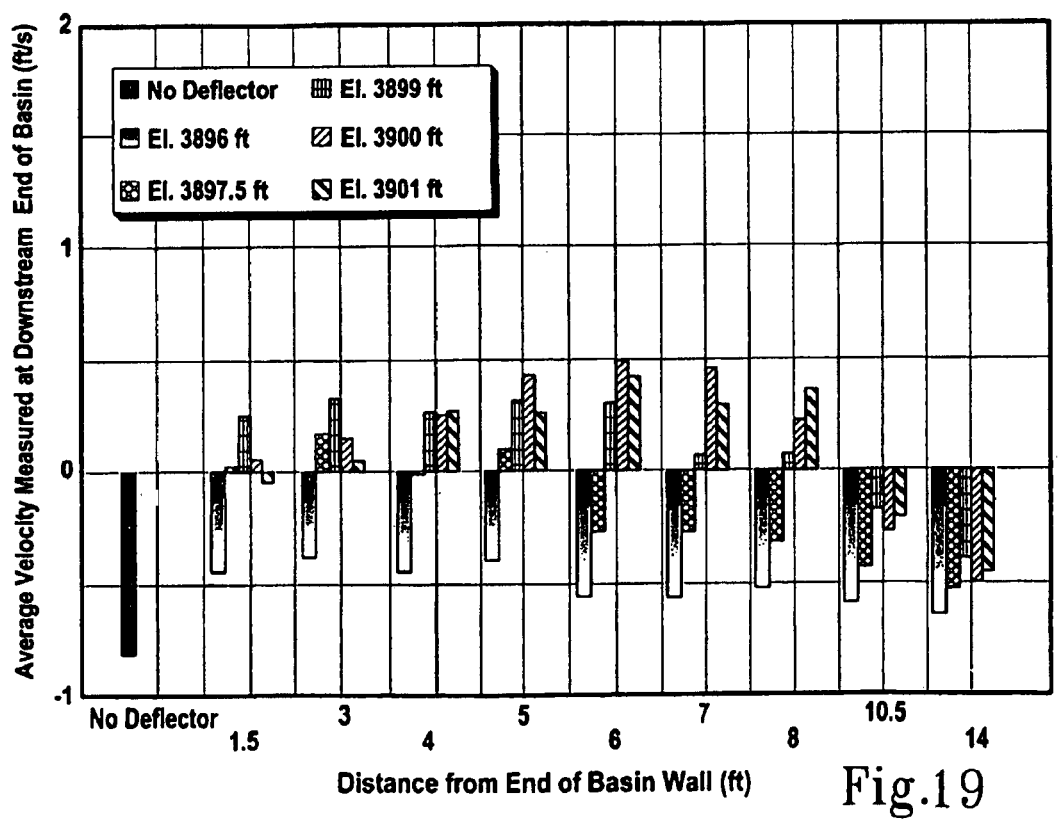
FIG. 19 shows the optimum deflector structure dimension that is upstream from the energy dissipating basin outlet is at 6 feet for an elevation of 3900 feet resulting in the highest magnitude of downstream direction flow velocity at 60% gate opening.

FIG. 19 indicates that the optimum deflector structure 70 dimension 106 is at 6 feet for an elevation of 3900 feet resulting in the highest magnitude of downstream direction flow 36 velocity at 60% gate opening. FIG. 19 also shows average velocity versus deflector structure 70 positioning at dimension 106 being from the energy dissipating basin outlet 56 going in the upstream flow direction 38 to the deflector structure 70 with the deflector structure 70 face 77 angled 108 at 60 degrees at 60% gate opening. Data is also shown without the deflector structure 70.

Figure 20:
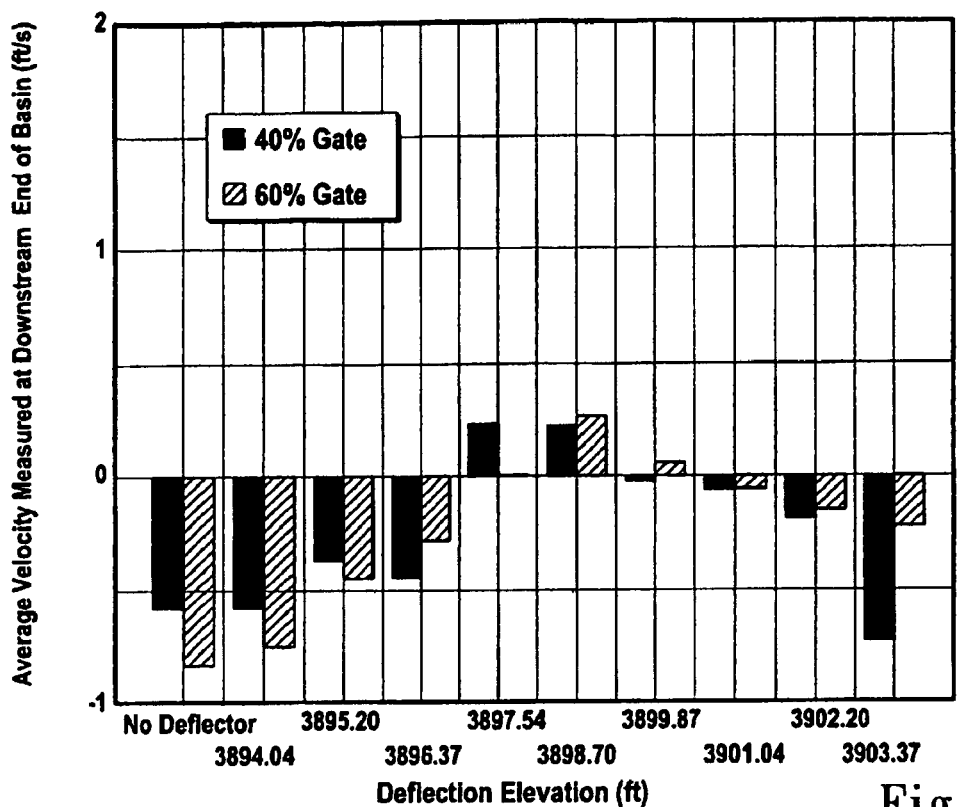
FIG. 20 shows the optimum deflector structure elevation is 3898.7 equaling a dimension of 9.7 feet from the energy dissipating basin floor resulting in the highest magnitude of downstream direction flow velocity at 40% gate opening and at 60% gate opening, for a deflector structure face angle to the energy dissipating basin floor of 60 degrees and a dimension upstream from the energy dissipating basin outlet of 1.5 feet.

FIG. 20 indicates that the optimum deflector structure 70 elevation is 3898.7 equaling dimension 104 of 9.7 feet resulting in the highest magnitude of downstream direction flow 36 velocity at 40% gate opening and 60% gate opening, for a deflector structure 70 face 77 angle 108 of 60 degrees and a dimension 106 of 1.5 feet. FIG. 20 also shows average velocity at 40% gate opening and 60% gate opening versus deflector structure 70 elevation being dimension 104 that is from the energy dissipating basin floor 48 to the deflector structure 70 going from 5.04 feet to 14.37 feet, also for the deflector structure 70 face 77 angled 108 at 60 degrees in relation to the energy dissipating basin floor 48, and with a dimension 106 of 1.5 feet that goes from the energy dissipating basin outlet 56 in an upstream flow direction 38 to the deflector structure 70. Data is also shown without the deflector structure 70.

Figure 21:
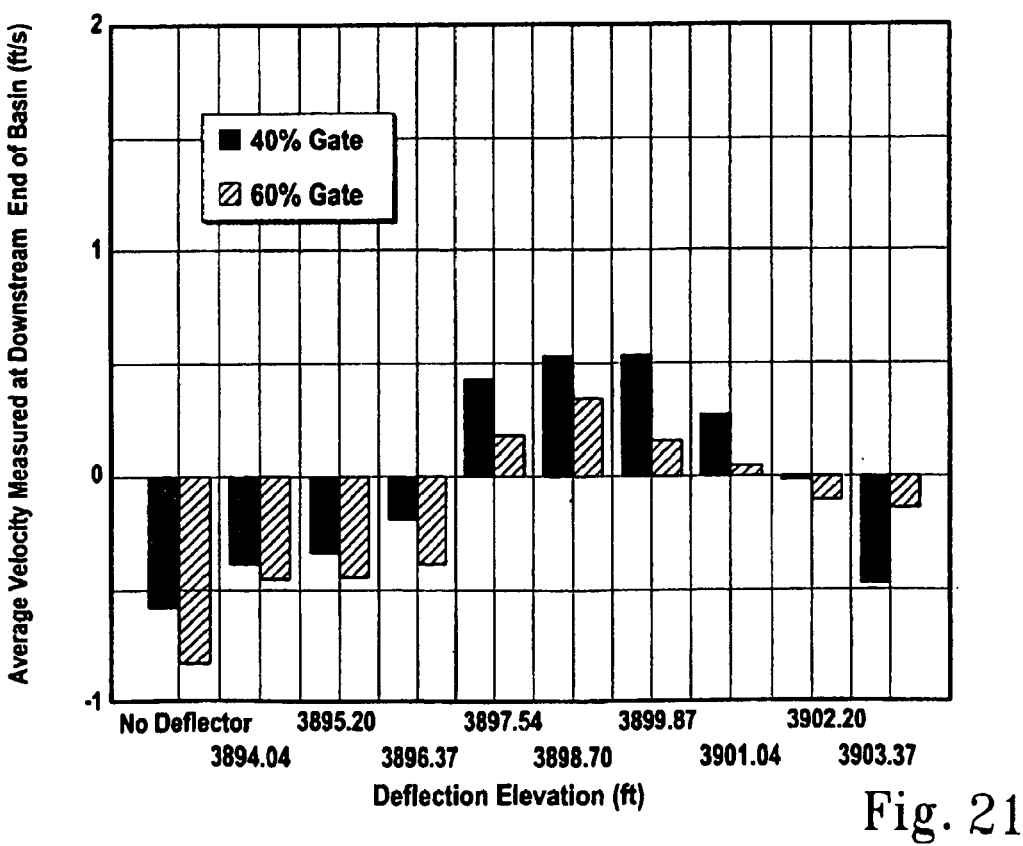
FIG. 21 shows the optimum deflector structure elevation is 3899.87 equaling a dimension of 10.87 feet from the energy dissipating basin floor resulting in the highest magnitude of downstream direction flow velocity at 40% gate opening and at 60% gate opening, for a deflector structure face angle to the energy dissipating basin floor of 60 degrees and a dimension upstream from the energy dissipating basin outlet of 3.0 feet.

FIG. 21 indicates that the optimum deflector structure 70 elevation is 3899.87 equaling dimension 104 of 10.87 feet resulting in the highest magnitude of downstream direction flow 36 velocity at 40% gate opening and 60% gate opening, for a deflector structure 70 face 77 angle 108 of 60 degrees and a dimension 106 of 3.0 feet. FIG. 21 also shows average velocity at 40% gate opening and 60% gate opening versus deflector structure 70 elevation being dimension 104 that is from the energy dissipating basin floor 48 to the deflector structure 70 going from 5.04 feet to 14.37 feet, also for the deflector structure 70 face 77 angled 108 at 60 degrees in relation to the energy dissipating basin floor 48, and with a dimension 106 of 3.0 feet that goes from the energy dissipating basin outlet 56 in an upstream flow direction 38 to the deflector structure 70. Data is also shown without the deflector structure 70.

Figure 22:
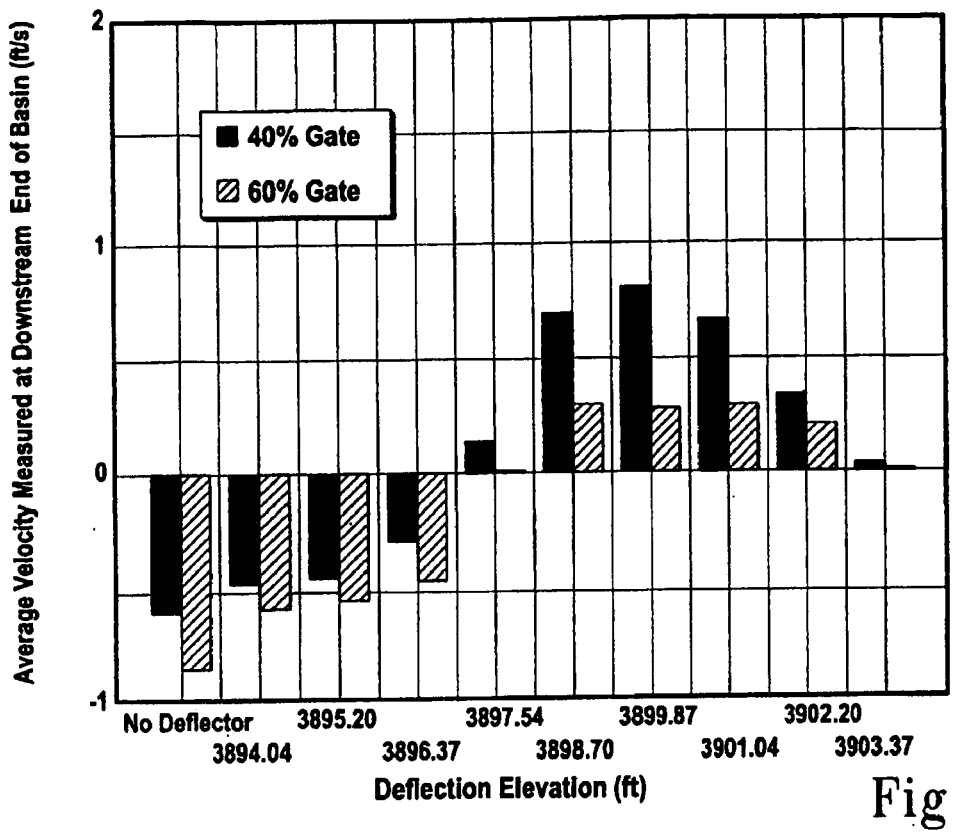
FIG. 22 shows the optimum deflector structure elevation is 3899.87 equaling a dimension of 10.87 feet above the energy dissipating basin floor resulting in the highest magnitude of downstream direction flow velocity at 40% gate opening and at 60% gate opening, for a deflector structure face angle to the energy dissipating basin floor of 60 degrees and a dimension upstream from the energy dissipating basin outlet of 4.0 feet.

FIG. 22 indicates that the optimum deflector structure 70 elevation is 3899.87 equaling dimension 104 of 10.87 feet resulting in the highest magnitude of downstream direction flow 36 velocity at 40% gate opening and 60% gate opening, for a deflector structure 70 face 77 angle 108 of 60 degrees and a dimension 106 of 4.0 feet. FIG. 22 also shows average velocity at 40% gate opening and 60% gate opening versus deflector structure 70 elevation being dimension 104 that is from the energy dissipating basin floor 48 to the deflector structure 70 going from 5.04 feet to 14.37 feet, also for the deflector structure 70 face 77 angled 108 at 60 degrees in relation to the energy dissipating basin floor 48, and with a dimension 106 of 4.0 feet that goes from the energy dissipating basin outlet 56 in an upstream flow direction 38 to the deflector structure 70. Data is also shown without the deflector structure 70.

Figure 23:
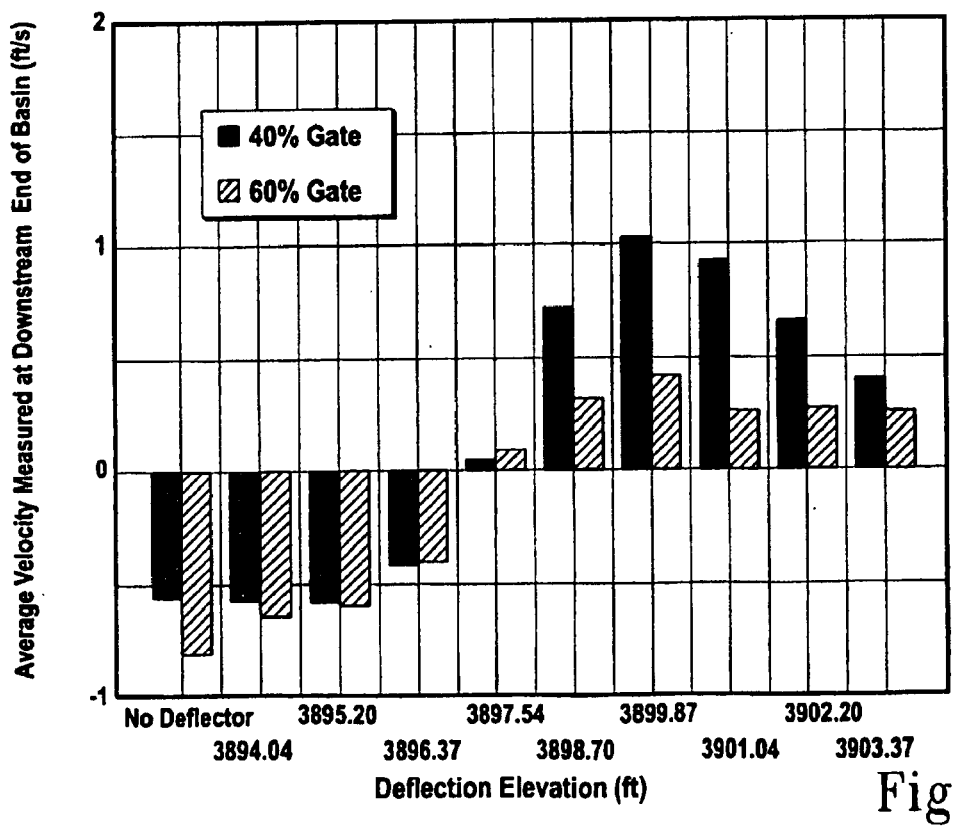
FIG. 23 shows the optimum deflector structure elevation is 3899.87 equaling a dimension above the energy dissipating basin floor of 10.87 feet resulting in the highest magnitude of downstream direction flow velocity at 40% gate opening and at 60% gate opening, for a deflector structure face angle to the energy dissipating basin floor of 60 degrees and a dimension upstream from the energy dissipating basin outlet of 5.0 feet.

FIG. 23 indicates that the optimum deflector structure 70 elevation is 3899.87 equaling dimension 104 of 10.87 feet resulting in the highest magnitude of downstream direction flow 36 velocity at 40% gate opening and 60% gate opening, for a deflector structure 70 face 77 angle 108 of 60 degrees and a dimension 106 of 5.0 feet. FIG. 23 also shows average velocity at 40% gate opening and 60% gate opening versus deflector structure 70 elevation being dimension 104 that is from the energy dissipating basin floor 48 to the deflector structure 70 going from 5.04 feet to 14.37 feet, also for the deflector structure 70 face 77 angled 108 at 60 degrees in relation to the energy dissipating basin floor 48, and with a dimension 106 of 5.0 feet that goes from the energy dissipating basin outlet 56 in an upstream flow direction 38 to the deflector structure 70. Data is also shown without the deflector structure 70.

Figure 24:
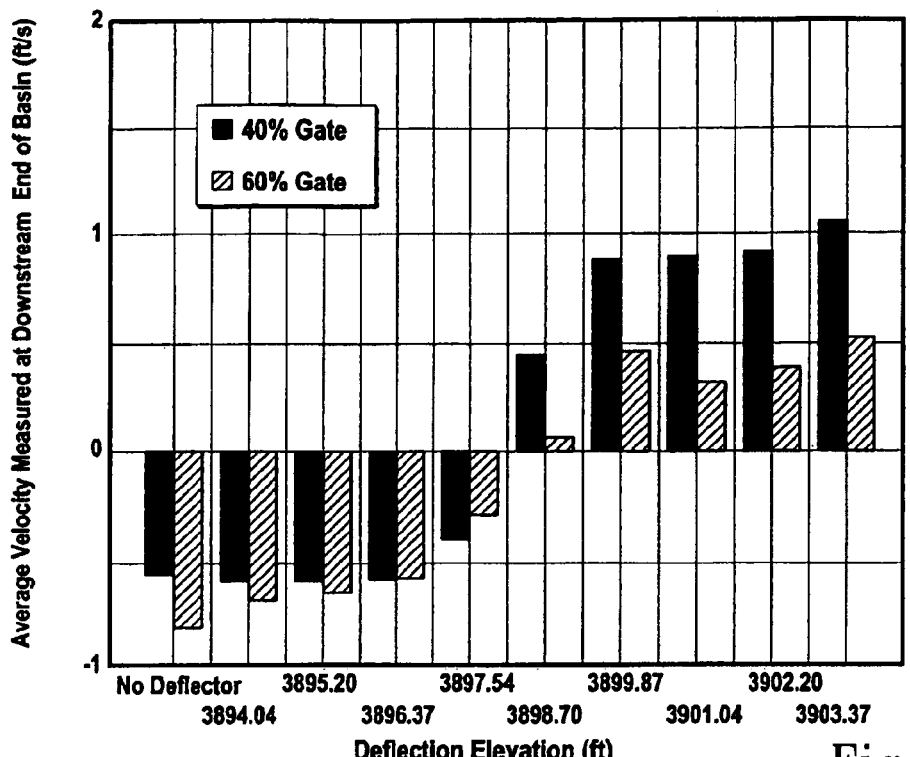
FIG. 24 shows the optimum deflector structure elevation is 3903.37 equaling a dimension above the energy dissipating basin floor of 14.37 feet resulting in the highest magnitude of downstream direction flow velocity at 40% gate opening and at 60% gate opening, for a deflector structure face angle to the energy dissipating basin floor of 60 degrees and a dimension upstream from the energy dissipating basin outlet of 7.0 feet.

FIG. 24 indicates that the optimum deflector structure 70 elevation is 3903.37 equaling dimension 104 of 14.37 feet resulting in the highest magnitude of downstream direction flow 36 velocity at 40% gate opening and 60% gate opening, for a deflector structure 70 face 77 angle 108 of 60 degrees and a dimension 106 of 7.0 feet. FIG. 24 also shows average velocity at 40% gate opening and 60% gate opening versus deflector structure 70 elevation being dimension 104 that is from the energy dissipating basin floor 48 to the deflector structure 70 going from 5.04 feet to 14.37 feet, also for the deflector structure 70 face 77 angled 108 at 60 degrees in relation to the energy dissipating basin floor 48, and with a dimension 106 of 7.0 feet that goes from the energy dissipating basin outlet 56 in an upstream flow direction 38 to the deflector structure 70. Data is also shown without the deflector structure 70.

Figure 25:
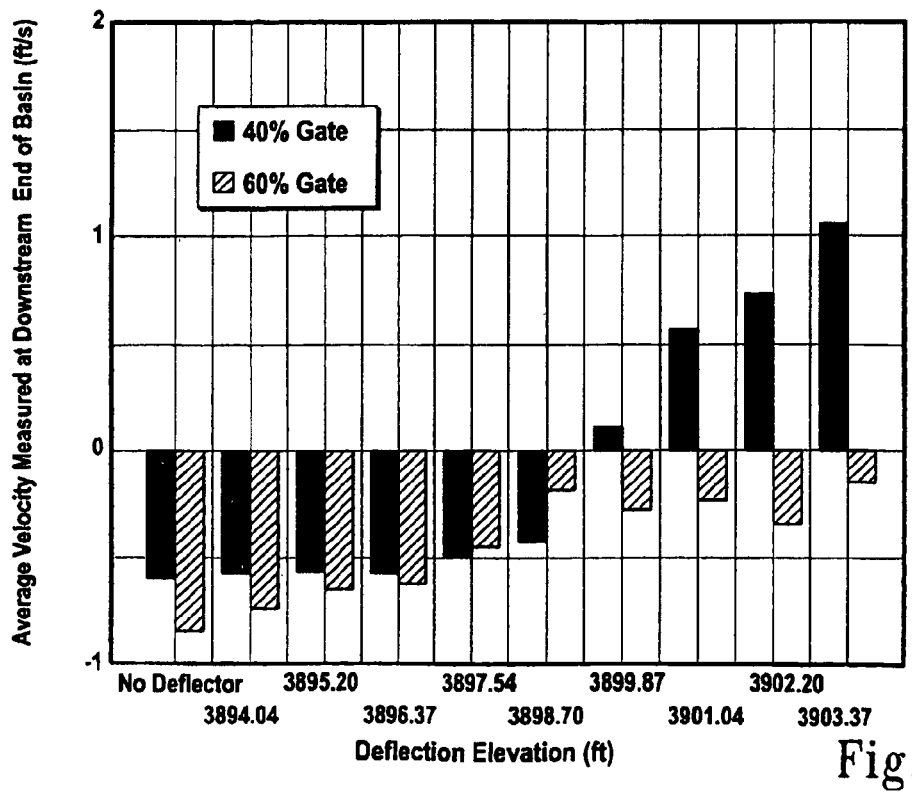
FIG. 25 shows the optimum deflector structure elevation is 3903.37 equaling a dimension above the energy dissipating basin floor of 14.37 feet resulting in the highest magnitude of downstream direction flow velocity at 40% gate opening and at 60% gate opening, for a deflector structure face angle to the energy dissipating basin floor of 60 degrees and a dimension upstream from the energy dissipating basin outlet of 10.5 feet.

FIG. 25 indicates that the optimum deflector structure 70 elevation is 3903.37 equaling dimension 104 of 14.37 feet resulting in the highest magnitude of downstream direction flow 36 velocity at 40% gate opening and 60% gate opening, for a deflector structure 70 face 77 angle 108 of 60 degrees and a dimension 106 of 10.5 feet. FIG. 25 also shows average velocity at 40% gate opening and 60% gate opening versus deflector structure 70 elevation being dimension 104 that is from the energy dissipating basin floor 48 to the deflector structure 70 going from 5.04 feet to 14.37 feet, also for the deflector structure 70 face 77 angled 108 at 60 degrees in relation to the energy dissipating basin floor 48, and with a dimension 106 of 10.5 feet that goes from the energy dissipating basin outlet 56 in an upstream flow direction 38 to the deflector structure 70. Data is also shown without the deflector structure 70.

Figure 26:
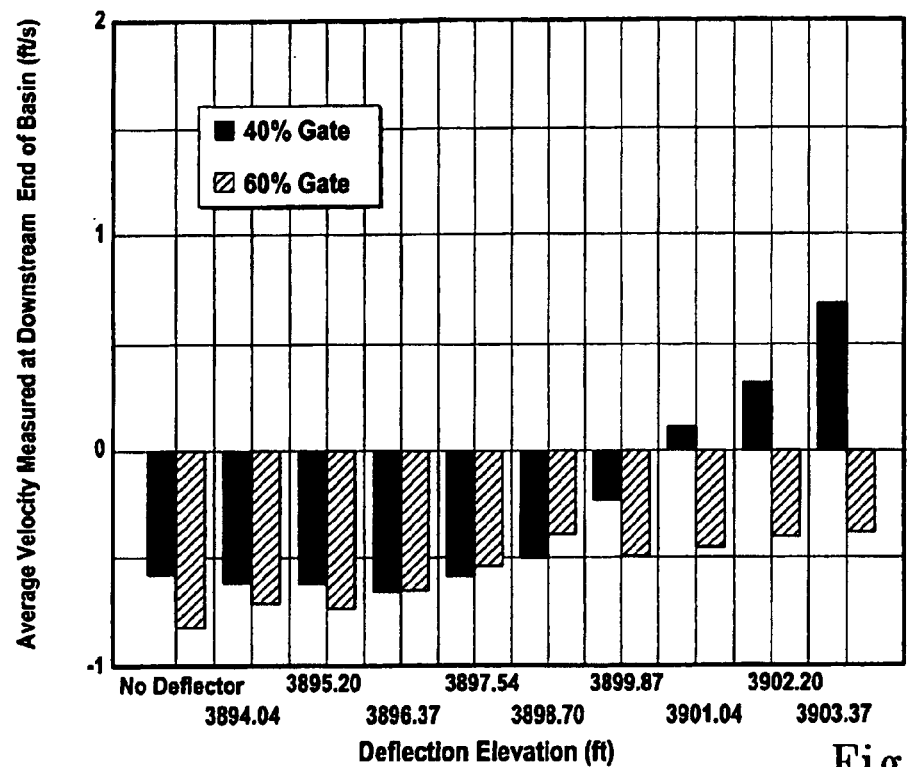
FIG. 26 shows the optimum deflector structure elevation is 3903.37 equaling a dimension above the energy dissipating basin floor of 14.37 feet resulting in the highest magnitude of downstream direction flow velocity at 40% gate opening and at 60% gate opening, for a deflector structure face angle to the energy dissipating basin floor of 60 degrees and a dimension upstream from the energy dissipating basin outlet of 14.0 feet.

FIG. 26 indicates that the optimum deflector structure 70 elevation is 3903.37 equaling dimension 104 of 14.37 feet resulting in the highest magnitude of downstream direction flow 36 velocity at 40% gate opening and 60% gate opening, for a deflector structure 70 face 77 angle 108 of 60 degrees and a dimension 106 of 14.0 feet. FIG. 26 also shows average velocity at 40% gate opening and 60% gate opening versus deflector structure 70 elevation being dimension 104 that is from the energy dissipating basin floor 48 to the deflector structure 70 going from 5.04 feet to 14.37 feet, also for the deflector structure 70 face 77 angled 108 at 60 degrees in relation to the energy dissipating basin floor 48, and with a dimension 106 of 14.0 feet that goes from the energy dissipating basin outlet 56 in an upstream flow direction 38 to the deflector structure 70. Data is also shown without the deflector structure 70.

Figure 27:
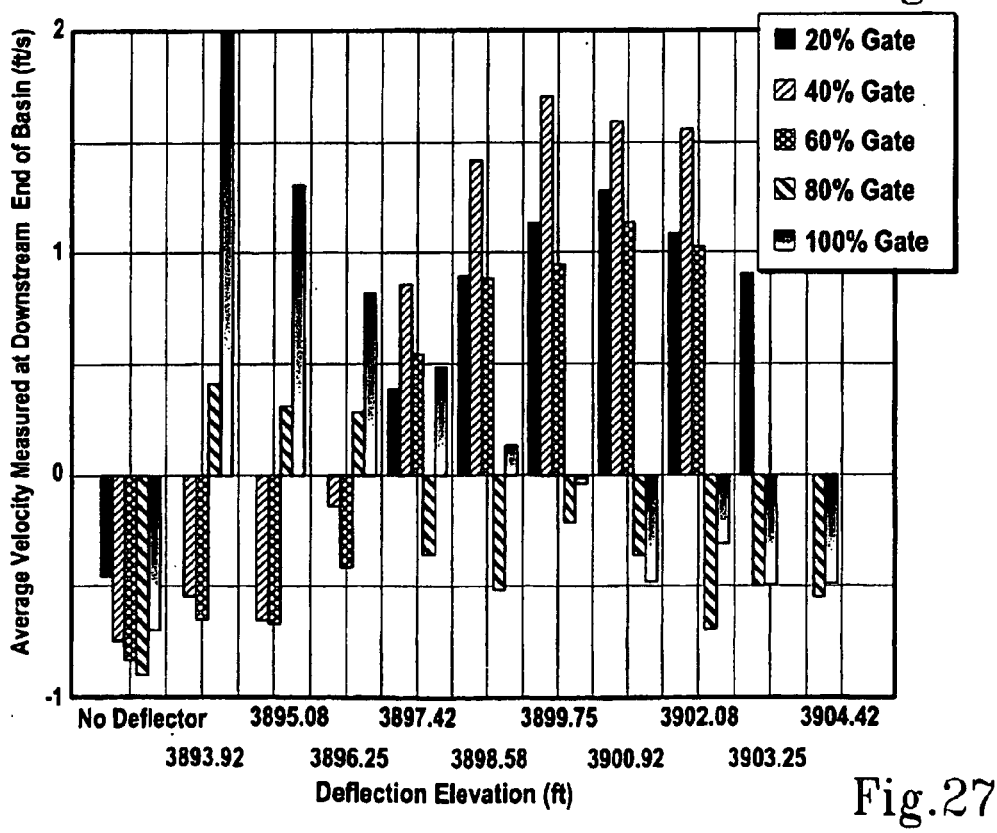
FIG. 27 shows the optimum deflector structure elevation is 3899.75 equaling a dimension above the energy dissipating basin floor of 10.75 feet resulting in the lowest magnitude of aggregate upstream direction flow velocity in going from a 20% gate opening to a 100% gate opening, for a deflector structure face angle to the energy dissipating basin floor of 80 degrees and a dimension upstream from the energy dissipating basin outlet of 5.0 feet.

FIG. 27 indicates that the optimum deflector structure 70 elevation is 3899.75 equaling dimension 104 of 10.75 feet resulting in the lowest magnitude of aggregate upstream direction flow 38 velocity in going from 20% gate opening to 100% gate opening, for a deflector structure 70 face 77 angle 108 of 80 degrees and a dimension 106 of 5.0 feet. FIG. 27 also shows average velocity in going from 20% gate opening to 100% gate opening versus deflector structure 70 elevation being dimension 104 that is from the energy dissipating basin floor 48 to the deflector structure 70 going from 4.92 feet to 15.42 feet, also for the deflector structure 70 face 77 angled 108 at 80 degrees in relation to the energy dissipating basin floor 48, and with a dimension 106 of 5.0 feet that goes from the energy dissipating basin outlet 56 in an upstream flow direction 38 to the deflector structure 70. Data is also shown without the deflector structure 70.

Figure 28:
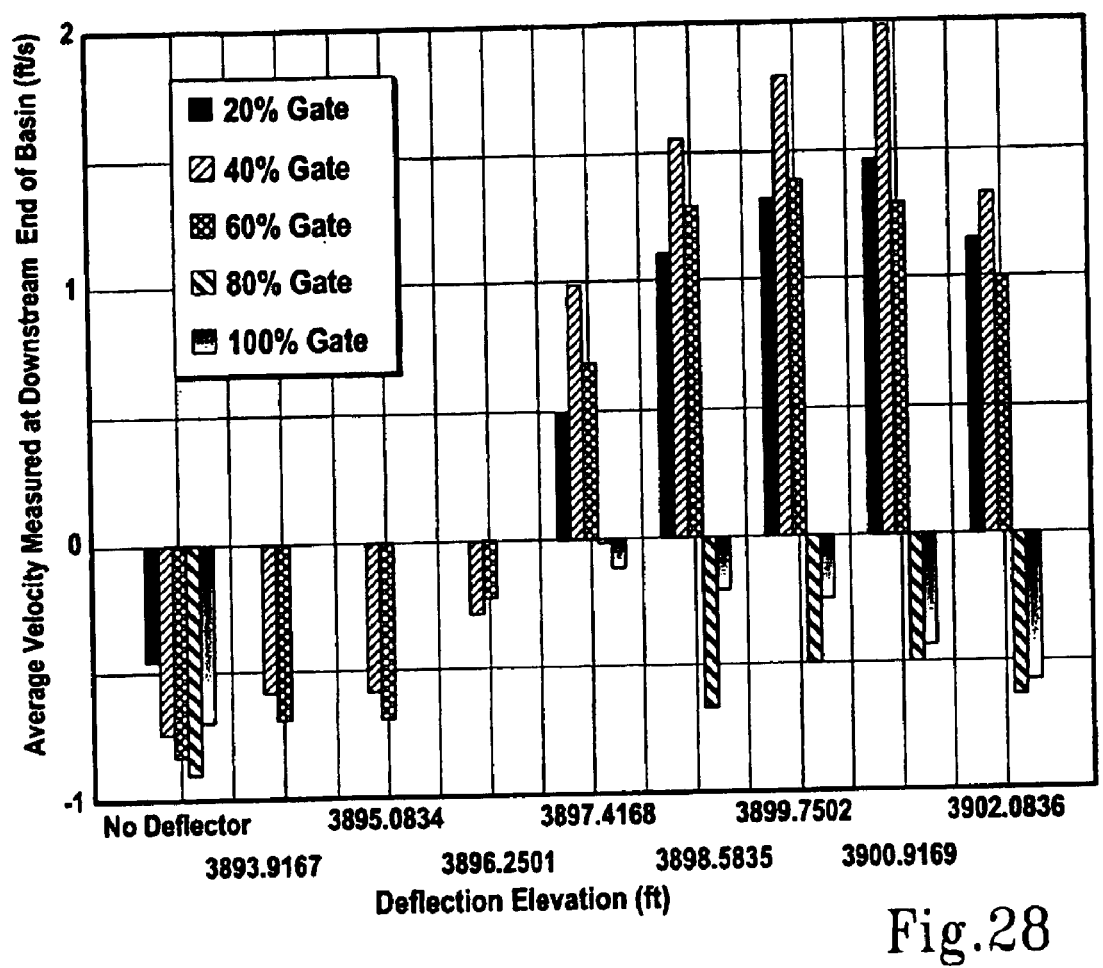
FIG. 28 shows the optimum deflector structure elevation is 3897.42 equaling a dimension above the energy dissipating basin floor of 8.42 feet resulting in the lowest magnitude of aggregate upstream direction flow velocity in going from a 20% gate opening to a 100% gate opening, for a deflector structure face angle to the energy dissipating basin floor of 90 degrees and a dimension upstream from the energy dissipating basin outlet of 5.0 feet.

FIG. 28 indicates that the optimum deflector structure 70 elevation is 3897.42 equaling dimension 104 of 8.42 feet resulting in the lowest magnitude of aggregate upstream direction flow 38 velocity in going from 20% gate opening to 100% gate opening, for a deflector structure 70 face 77 angle 108 of 90 degrees and a dimension 106 of 5.0 feet. FIG. 28 also shows average velocity in going from 20% gate opening to 100% gate opening versus deflector structure 70 elevation being dimension 104 that is from the energy dissipating basin floor 48 to the deflector structure 70 going from 4.92 feet to 13.08 feet, also for the deflector structure 70 face 77 angled 108 at 90 degrees in relation to the energy dissipating basin floor 48, and with a dimension 106 of 5.0 feet that goes from the energy dissipating basin outlet 56 in an upstream flow direction 38 to the deflector structure 70. Data is also shown without the deflector structure 70.

Several trends can be noted from the aforementioned deflector structure 70 test data, firstly; in referring to FIGS. 12, 27, and 28 that the counter rotating eddy current velocity transition points 43 do move with large changes in fluid 34 flowrate, i.e. 20% gate opening to 100% gate opening, making positioning of the deflector structure 70 difficult to function properly in eliminating the upstream direction flow 38 at a wide range of fluid 34 flowrates. As the fluid 34 flow increases the velocity transition point 43 lowers toward the energy dissipating basin floor 48 meaning that the downstream direction flow 36 layer thickens with fluid 34 flow increases in going from the fluid free surface 46 downwards towards the energy dissipating basin floor 48. This makes the dimension 104, being the height of the deflector structure 70 above the energy dissipating basin floor 48 particularly important in being able to direct a significant enough portion of the downstream direction flow 36 which is directly above the velocity transition point 43 to overcome the upstream direction flow 38 that exists adjacent to the energy dissipating basin floor 48 near the energy dissipating basin outlet 56 in converting the upstream direction flow 38 into downstream direction flow 36 which is desired. Thus the deflector structure 70 cannot be located below the velocity transition point 43 at any fluid 34 flowrate as it will not be able to direct any downstream direction flow 36 to overcome the upstream direction flow 38 that exists adjacent to the energy dissipating basin floor 48 near the energy dissipating basin outlet 56. Also, if the deflector structure 70 is located too much above, meaning that the deflector structure dimension 104 is large, the velocity transition point 43, the redirected downstream flow 36 losses too much energy to overcome the upstream direction flow 38 that exists adjacent to the energy dissipating basin floor 48 near the energy dissipating basin outlet 56 due to the large distance between the deflector structure 70 and the energy dissipating basin floor 48. Optimally, the deflector structure 70 dimension 104 is about 8 feet to minimize the upstream direction flow 38 velocity over the widest range of fluid 34 flowrates, i.e. maximum % range of gate openings.

Another trend in the test model data concerns the angle 108 that the deflector structure 70 face 77 makes in relation to the energy dissipating basin floor 48, in particular referring to FIGS. 13, 14, 15, 16, 17, 27, and 28. That the 90 degree angle 108 produces a higher downstream direction flow 36 velocity at higher flowrates to about 60% gate opening, however, at 80% and 100% gate opening the 80 degree angle 108 results in a lower level of the undesired upstream direction flow 38 velocity. Looking in particular at FIG. 16 the angle 108 appears to optimize at about 70 degrees in minimizing the level of the undesired upstream direction flow 38 velocity at 40% gate opening for all tested elevations being dimension 104. However, looking at FIG. 17 the angle 108 at about 80 to 90 degrees is required to maximize downstream direction flow 36 velocity at 60% gate opening. Thus in summary of the angle 108 of the deflector structure 70 face 77, with the elevation dimension 104 optimized for a larger safety factor, by having a higher downstream direction flow 36 velocity to minimize the risk of damaging upstream direction flow 38 velocity at the floor 48 of the energy dissipating basin outlet 56, an angle 108 of 80 to 90 degrees appears optimum for the deflector structure 70 face 77 in relation to the energy dissipating basin floor 48 for a wide variance of flowrates, i.e. a wide variance of % gate openings.

A further trend in the test model data concerns the deflector structure 70 height dimension 102, in looking at FIGS. 13 and 14 the deflector structure 70 with a 5 feet height dimension 102, resulted in a higher downstream direction flow 36 velocity which increases the safety factor to minimize the risk of damaging upstream direction flow 38 velocity at the floor 48 of the energy dissipating basin outlet 56 for a wide variance of flowrates, i.e. a wide variance of % gate openings. Deflector structure 70 height dimensions 102 greater than 5 feet could be tested in the future, however, having considerations for higher baffle apparatus 30 construction costs and higher baffle apparatus 30 loads from the downstream direction flow 36 velocity.

A yet further trend in the test model data relates to the dimension 106 that goes from the energy dissipating basin outlet 56 in an upstream flow direction 38 to the deflector structure 70, referring to FIGS. 18, 19, 20, 21, 22, 23, 24, 25, and 26 it can be observed that at a dimension 106 over 5 feet, a higher number of undesirable upstream flow 38 velocities occur at more elevation levels, i.e. dimension 104 due to the increasing distance of the deflector structure 70 from the energy dissipating basin outlet 56 causing the redirected downstream flow 36 to lose too much energy to overcome the upstream direction flow 38 that exists adjacent to the energy dissipating basin floor 48 near the energy dissipating basin outlet 56 due to the large distance between the deflector structure 70 and the energy dissipating basin floor 48 at the energy dissipating basin outlet 56. At dimension 106 being low in the 1.5 to 3 feet range the safety factor of higher downstream direction flow 36 velocity is low with the damaging upstream direction flow 38 velocity at the floor 48 of the energy dissipating basin outlet 56 predominating for the variance of elevations or dimensions 104 tested, making a desirable dimension 106 of about 5 feet.

In summary, a method is disclosed for optimizing the deflector structure 70 attributes of dimension 104 being the height of the deflector structure 70 above the energy dissipating basin floor 48, angle 108 being the deflector structure 70 face 77 angle in relation to the energy dissipating basin floor 48, dimension 106 that goes from the energy dissipating basin outlet 56 in an upstream flow direction 38 to the deflector structure 70, and the deflector structure 70 height dimension 102 to minimize the occurrence of damaging upstream direction flow 38 velocity at the floor 48 of the energy dissipating basin outlet 56 over a range of fluid 34 flowrates identified as % gate openings in the open flow channel energy dissipating basin 58. Based upon the aforementioned testing a dimension 104 of about 8 feet, an angle 108 of about 80 to 90 degrees, a dimension 106 of about 5 feet, and a dimension 102 of about 5 feet were determined to minimize the occurrence of damaging upstream direction flow 38 velocity at the floor 48 of the energy dissipating basin outlet 56 over a range of fluid 34 flowrates identified as % gate openings in the open flow channel energy dissipating basin 58. However, the aforementioned method could be applied to numerous open flow channel energy dissipating basin types to reduce or eliminate abrasive damage from streambed material.

CONCLUSION

Accordingly, the present invention of a Baffle Apparatus has been described with some degree of particularity directed to the embodiments and method of use of the present invention. It should be appreciated, though; that the present invention is defined by the following claims construed in light of the prior art so modifications or changes may be made to the exemplary embodiments and method of use of the present invention without departing from the inventive concepts contained therein.

The invention claimed is:

1. A baffle apparatus for directing fluid flow to reduce damage to an open flow channel energy dissipating basin that includes an inlet, an outlet, a floor, a sidewall that extends upward from an edge of the floor, and an opposing sidewall that extends upward from an opposing edge of the floor defining an open flow channel energy dissipating basin interior with an energy dissipating basin span between the sidewall and the opposing sidewall, comprising:
   (a) a deflector structure that is generally planar and is adjustably positioned substantially transverse to a downstream direction flow in the energy dissipating basin, said deflector structure spanning between the sidewall and the opposing sidewall above the floor, wherein said deflector structure is positioned to direct flow in the energy dissipating basin to flow in a downstream direction from an opposing upstream direction adjacent to the energy dissipating basin floor; and
   (b) a channel deflector structure guide wherein said planar deflector structure is slidably engaged with said channel deflector structure guide such that said planar deflector structure slides within said channel deflector structure guide to a selected distance above the energy dissipating basin floor with the distance fixed by an adjustable attachment positioned within said channel deflector structure guide.

2. A baffle apparatus according to claim 1 wherein said channel deflector structure guide for adjustably positioning said distance further comprises a lockable element that is adapted to engage said channel deflector structure guide and said planar deflector structure to secure said planar deflector structure distance above the energy dissipating basin floor in a locked state and to allow said planar deflector structure distance to be adjustably positioned above the energy dissipating basin floor in an unlocked state.

3. A baffle apparatus for directing fluid flow to reduce damage to an open flow channel energy dissipating basin that includes an inlet, an outlet, a floor, a sidewall that extends upward from an edge of the floor, and an opposing sidewall that extends upward from an opposing edge of the floor defining an open flow channel energy dissipating basin interior with an energy dissipating basin span between the sidewall and the opposing sidewall, comprising:
   (a) a deflector structure that is generally planar and is adjustably positioned substantially transverse to a downstream direction flow in the energy dissipating basin, said deflector structure spanning between the sidewall and the opposing sidewall above the floor, wherein said deflector structure is positioned to direct flow in the energy dissipating basin to flow in a downstream direction from an opposing upstream direction adjacent to the energy dissipating basin floor; and (b) a channel structure deflector guide that is engaged with said planar deflector structure, said channel structure deflector guide is pivotally attached to the sidewall, or the opposing sidewall, or both the sidewall and the opposing sidewall on one end and adjustably attached to the sidewall, or the opposing sidewall, or both the sidewall and the opposing sidewall on the other end, wherein the angle of said planar deflector structure is adjustably positioned by said channel deflector structure guide pivoting to a selected angle in relation to the energy dissipating basin floor, said angle is fixed by said adjustable attachment.

4. A baffle apparatus according to claim 3 wherein said channel structure deflector guide for adjustably positioning said angle further comprises a lockable element that is adapted to engage said channel structure deflector guide for adjustably positioning the angle to secure said deflector structure angle in a locked state and to allow said deflector structure angle to be adjustably positioned in an unlocked state.

5. A baffle apparatus according to claim 3 wherein said deflector is parallelepiped in shape.

6. A baffle apparatus according to claim 5 wherein said deflector is constructed of a structural steel framework enclosed with plate steel panels.

7. A baffle apparatus according to claim 3 wherein said planar deflector structure is positioned upstream of the energy dissipating basin outlet at a selected distance to further increase a velocity of the flow in a downstream direction from an opposing upstream direction adjacent to the energy dissipating basin floor outlet.

8. A baffle apparatus according to claim 3 wherein said channel structure deflector guide for adjustably positioning and securing said planar deflector structure to the sidewall is accomplished by further comprising an epoxy anchor that is utilized to secure said channel structure deflector guide for adjustably positioning said deflector structure to the sidewall, or the opposing sidewall, or both the sidewall and the opposing sidewall.

9. A baffle apparatus for directing fluid flow to reduce damage to an open flow channel energy dissipating basin that includes an inlet, an outlet, a floor, a sidewall that extends upward from an edge of the floor, and an opposing sidewall that extends upward from an opposing edge of the floor defining an open flow channel energy dissipating basin interior with an energy dissipating basin span between the sidewall and the opposing sidewall, comprising:

(a) a deflector structure that is generally planar and is fixedly positioned substantially transverse to a downstream direction flow in the energy dissipating basin, said deflector structure spanning between the sidewall and the opposing sidewall, said planar deflector structure positioned a selected distance above the floor, said planar deflector structure is also positioned at a selected distance upstream of the energy dissipating basin outlet, and said planar deflector structure forms an angle of forty (40) to eighty (80) degrees in relation to the energy dissipating basin floor facing upstream, wherein said deflector structure is positioned to direct flow in the energy dissipating basin to flow in a downstream direction from an opposing upstream direction adjacent to the energy dissipating basin floor; and (b) a structural steel channel with mounting plate that is attached to said deflector structure, said structural steel channel with mounting plate is also secured to the sidewall, or the opposing sidewall, or both the sidewall and the opposing sidewall, said structural steel channel with mounting plate is operational to fixedly position and secure said deflector structure to the sidewall.

10. A baffle apparatus according to claim 9 further comprising an epoxy anchor that is utilized to secure said channel to the sidewall, or the opposing sidewall, or both the sidewall and the opposing sidewall.

11. A baffle apparatus for directing fluid flow to reduce damage to an open flow channel energy dissipating basin that includes an inlet, an outlet, a floor, a sidewall that extends upward from an edge of the floor, and an opposing sidewall that extends upward from an opposing edge of the floor defining an open flow channel energy dissipating basin interior with an energy dissipating basin span between the sidewall and the opposing sidewall, comprising:

(a) a deflector structure that is generally planar and parallelepiped in shape, said deflector structure is constructed of a structural steel framework enclosed with plate steel panels, said deflector structure is fixedly positioned substantially transverse to a downstream direction flow in the energy dissipating basin, said deflector structure spanning between the sidewall and the opposing sidewall, said planar deflector structure positioned a selected distance above the floor, said planar deflector structure is also positioned at a selected distance upstream of the energy dissipating basin outlet, and said planar deflector structure forms an angle of forty (40) to eighty (80) degrees in relation to the energy dissipating basin floor facing upstream, wherein said deflector structure is positioned to direct flow in the energy dissipating basin to flow in a downstream direction from an opposing upstream direction adjacent to the energy dissipating basin floor; and (b) means for fixedly positioning and securing said deflector structure to the sidewall.

12. A method for optimizing a position of a selectively adjustably positioned baffle apparatus for the purpose of directing fluid flow to reduce damage to an open flow channel energy dissipating basin that includes an inlet, an outlet, a floor, a sidewall that extends upward from an edge of the floor, and an opposing sidewall that extends upward from an opposing edge of the floor defining an open flow channel energy dissipating basin interior with an energy dissipating basin span between the sidewall and the opposing sidewall, comprising the steps of:

(a) providing a baffle apparatus that includes a deflector structure that is generally planar and is adjustably positioned substantially transverse to a downstream direction flow in the energy dissipating basin, said deflector structure spanning between the sidewall and the opposing sidewall above the floor, and a means for selectively adjustably positioning and securing said deflector structure to the sidewall, wherein said deflector structure directs flow in the energy dissipating basin to flow in a downstream direction from an opposing upstream direction adjacent to the floor;

(b) determining a range of fluid flowrates that can occur in the energy dissipating basin corresponding to a minimum fluid flow rate and a maximum fluid flow rate present at the energy dissipating basin inlet;

(c) measuring fluid velocity profiles corresponding to said minimum fluid flow rate that are adjacent to the energy dissipating basin floor, adjacent to a fluid free surface, and at a plurality of points or locations in between said adjacent to the energy dissipating basin floor velocity profile and said adjacent to the fluid free surface velocity profile, said fluid velocity profiles to be taken adjacent to the energy dissipating basin outlet;

(d) measuring fluid velocity profiles corresponding to said maximum fluid flow rate that are adjacent to the energy dissipating basin floor, adjacent to a fluid free surface, and at a plurality of points or locations in between said adjacent to the energy dissipating basin floor velocity profile and said adjacent to the fluid free surface velocity profile, said fluid velocity profiles to be taken adjacent to the energy dissipating basin outlet;

(e) measuring fluid velocity profiles corresponding to a plurality of selected fluid flowrates between said minimum fluid flow rate and said maximum fluid flow rate, for each selected fluid flow rate measuring fluid velocity profiles adjacent to the energy dissipating basin floor, adjacent to a fluid free surface, and at a plurality of points or locations in between said adjacent to the energy dissipating basin floor velocity profile and said adjacent to the fluid free surface velocity profile, said fluid velocity profiles to be taken adjacent to the energy dissipating basin outlet;

(f) mapping a composite fluid velocity profile adjacent to the energy dissipating basin outlet for each of said minimum fluid flow rate, maximum fluid flow rate, and said selected fluid flow rates between said minimum fluid flow rate and said maximum fluid flow rate;

(g) determining from said composite fluid velocity profiles for each of said minimum fluid flow rate, maximum fluid flow rate, and said selected fluid flow rates between said minimum fluid flow rate and said maximum fluid flow rate, the location and magnitude of counter rotating eddies defined in particular by a transition point location for each of said minimum, maximum, and other selected fluid flow rates, wherein each said transition point is defined as a direction of a fluid flow velocity reversal going from a downstream direction to an upstream direction at the energy dissipating basin outlet, thus producing a plurality of transition point locations corresponding to each of a plurality of fluid flow rates; and (h) positioning said baffle apparatus such that said baffle apparatus engages a portion of the downstream direction fluid flow velocity being directed to produce a downstream direction fluid flow velocity adjacent to the floor of the energy dissipating basin outlet at substantially all of said plurality of fluid flow rates, thus eliminating said transition point locations and upstream direction fluid flow velocity adjacent to the floor of the energy dissipating basin outlet for substantially all of said minimum fluid flow rate, said maximum fluid flow rate, and said selected intermediate fluid flow rates.

13. A method for optimizing a position of a baffle apparatus according to claim 12 wherein said step of positioning said baffle apparatus further comprises positioning said deflector structure at a selected distance upstream from the energy dissipating basin outlet.

14. A method for optimizing a position of a baffle apparatus according to claim 12 wherein said step of positioning said baffle apparatus further comprises positioning said deflector structure at a selected distance from the energy dissipating basin floor from between being adjacent to the energy dissipating basin floor from being adjacent to the fluid free surface.

15. A method for optimizing a position of a baffle apparatus according to claim 12 wherein said step of positioning said baffle apparatus further comprises positioning said deflector structure at a selected angle in relation to the energy dissipating basin floor.

16. A method for optimizing a position of a baffle apparatus according to claim 12 further comprising a step of optimizing said deflector structure height to further increase a velocity of the flow in a downstream direction from an opposing upstream direction adjacent to the energy dissipating basin floor outlet.

* * * * *